United States Patent
Yamamoto et al.

(10) Patent No.: US 7,991,986 B2
(45) Date of Patent: Aug. 2, 2011

(54) MICROPROCESSOR STARTING TO EXECUTE A COMPUTER PROGRAM AT A PREDETERMINED INTERVAL

(75) Inventors: Tsuyoshi Yamamoto, Okazaki (JP);
Takayuki Matsuda, Kariya (JP);
Akimasa Niwa, Kiyosu (JP)

(73) Assignee: DENSO CORPORATION, Kariya (JP)

( * ) Notice: Subject to any disclaimer, the term of this patent is extended or adjusted under 35 U.S.C. 154(b) by 985 days.

(21) Appl. No.: 11/902,365

(22) Filed: Sep. 20, 2007

(65) Prior Publication Data

US 2008/0072013 A1 Mar. 20, 2008

(30) Foreign Application Priority Data

Sep. 20, 2006 (JP) ................................ 2006-254188

(51) Int. Cl.
*G06F 9/48* (2006.01)
*G06F 9/445* (2006.01)
(52) U.S. Cl. ....................................... 712/245; 718/102
(58) Field of Classification Search ................. 712/222, 712/245; 718/102
See application file for complete search history.

(56) References Cited

U.S. PATENT DOCUMENTS

| | | | | |
|---|---|---|---|---|
| 6,341,347 | B1* | 1/2002 | Joy et al. | 712/228 |
| 6,823,517 | B1* | 11/2004 | Kalman | 718/108 |
| 6,829,697 | B1* | 12/2004 | Davis et al. | 712/21 |
| 6,915,517 | B1* | 7/2005 | Imamura et al. | 718/103 |
| 7,069,425 | B1 | 6/2006 | Takahashi | |
| 2002/0147760 | A1* | 10/2002 | Torii | 709/107 |
| 2005/0240752 | A1* | 10/2005 | Yokoi et al. | 712/1 |

FOREIGN PATENT DOCUMENTS

| | | |
|---|---|---|
| JP | H05-233277 | 9/1993 |
| JP | 2000-330785 | 11/2000 |

\* cited by examiner

*Primary Examiner* — Daniel Pan
(74) *Attorney, Agent, or Firm* — Posz Law Group, PLC

(57) ABSTRACT

A microprocessor which is adapted to start a second task at a predetermined time when a first task is running if a current time becomes to be equal to the predetermined time is disclosed. The microprocessor executing an instruction read out from a program address updated every time when each execution of instruction is completed, includes update ceasing means for ceasing the program address from being updated when an stopping time comes in order to abort a first task defined by a first computer program and overwriting means for overwriting the program address with an initial address of a second computer program when a predetermined time comes in order to start to execute a second task defined by the second computer program at the predetermined time.

24 Claims, 15 Drawing Sheets

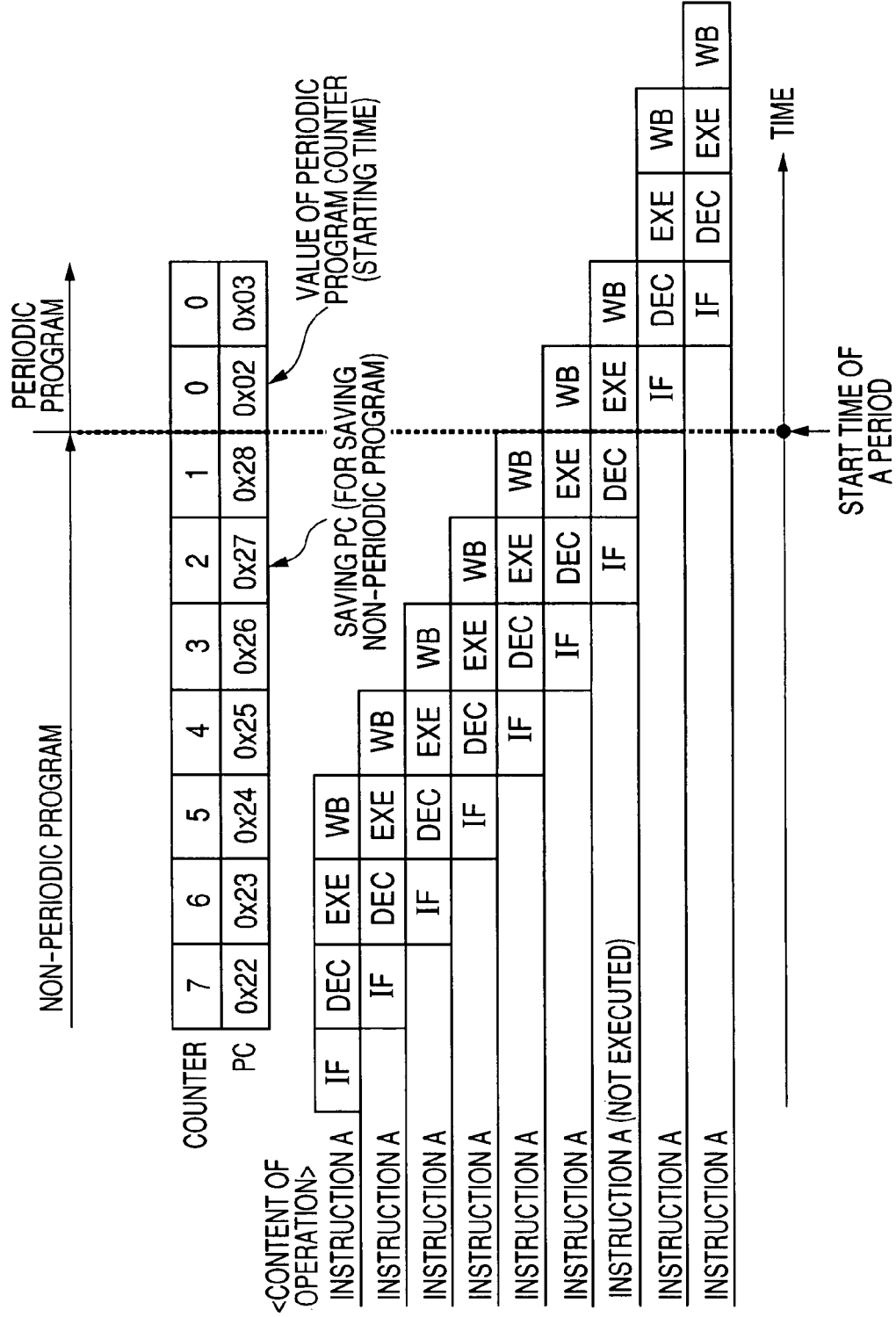

MICROPROCESSOR STARTING TO EXECUTE A COMPUTER PROGRAM AT A PREDETERMINED INTERVAL

CROSS REFERENCE TO RELATED APPLICATION

The present application relates to and incorporates by reference Japanese Patent Application No. 2006-254188 filed on Sep. 20, 2006.

BACKGROUND OF THE INVENTION

1. The Field of the Invention

The present invention relates to a microprocessor which operates according to a computer program and a microcomputer that utilizes the microprocessor, in particular to a microprocessor that starts up to executes a periodic computer program which is defined as a computer program that starts up to be executed correctly at a predetermined time interval while the microprocessor executes a non-periodic computer program only if the periodic computer program is not running. In more particularly, the present invention relates to a starting up and stopping method for starting up and stopping to execute the periodic computer program when the non-periodic computer program is running and waiting for running, respectively.

2. Description of the Prior Art

Recently, conventional dedicated purpose computers or application specific circuits are permitted to be replaced with general purpose microprocessors (hereafter, referred to as "microprocessors" for simplicity) in accordance with the development of microcomputer technologies. One of advantages of the microcomputers can be attributed to a fact that a microcomputer that has a memory configured to execute predetermined operations defined by a computer program which is stored in the memory only after the microcomputer is activated. Thus, it is easily possible for a user to change operations which are needed to be carried out by the microcomputer for the user's convenience. In a use of the general purpose microcomputer, it is important to adjust the operation timing at which a predetermined operations defined by a computer program starts to be executed.

There is a known prior art method for adjusting the operation timings at which a periodic computer program should be started up to be executed repeatedly at a predetermined interval by the microprocessor. In the known method, while the microprocessor is already running a non-periodic computer program, an external timer circuit is connected to the microprocessor that has a central processing unit (CPU) and the external timer circuit outputs an interrupt instruction signal to the CPU of the microprocessor so as to stop or pause to run the non-periodic computer program. In more detail, the external timer circuit outputs the interrupt instruction signal periodically at a predetermined interval to the CPU of the microprocessor so as to generate a single highest level interrupt operation in processing of the microprocessor and to cause the microprocessor to start up running the periodic computer program instead of the non-periodic computer program periodically at the predetermined interval.

However, even though the microprocessor receives the highest level interrupt instruction signal, it sometimes occurs that an interrupt operation cannot be executed by the microprocessor immediately after receiving the highest level interrupt instruction signal. That is, for example, during a data transfer operation between memories which requires a plurality of bus cycles to carry out, during sequential operations defined by a branch instruction or during start-up and return sequential operations defined by another interrupt instruction than the single highest level interrupt instruction, any interrupt operation is prohibited to be executed until an operation among those mentioned above, that is, the data transfer operation, the sequential operations, and the like, will be completed even if some interrupt instruction signal is received by the microcomputer. In other words, when the microprocessor is executing one of the above mentioned operations, even if the microprocessor receives an interrupt instruction signal from the external timer circuit in order to start up periodic operations determined by the periodic computer program, the microprocessor cannot start to execute an operation defined by the interrupt instruction so that a start up timing when an execution of the periodic operations is started is delayed. Therefore, it is difficult for the microprocessor to start executing the periodic computer program precisely at the predetermined interval.

One conventional microprocessor for solving such the problem and for reliably starting to execute the periodic computer program at the predetermined interval is disclosed in Japanese Patent Laid-open No. Hei 5-233277. A microprocessor has a processing unit, a time adjustment unit, and a buffer. The processing unit executes an instruction code. The time adjustment unit adjusts the time between two instruction codes. All of the processing unit, the time adjustment unit, and the buffer share an internal bus, besides the buffer connects to an external bus. The time adjustment unit has a time measurement unit, a certain time set unit, a difference operation unit, and an idle state insertion unit. The time measuring unit measures the time between two instruction codes. The certain time set unit sets a certain time. The difference operation unit computes the difference between a time set by the certain time set unit and a further time measured by the time measuring unit. The idle state insertion unit inserts an idle state for a period corresponding to the difference obtained by the difference operation unit.

The microcomputer disclosed in Japanese Patent Laid-open No. Hei 5-233277 to Aihara and Hoshino is configured to start to execute a computer program at a predetermined time as follows.

If the processing unit executes a first instruction which indicates initiating a periodic operation defined by the periodic computer program, a counter value of the time measurement unit is initialized to 0. The counter value thereof is incremented at the predetermined interval. Here, it is assumed t1001 is a time when the first instruction is issued.

Then, the processing unit executes a second instruction which indicates finishing the periodic operation defined by the periodic computer program. Here, it is assumed t1002 is a time when the second instruction is issued. Next, the difference operation unit calculates the difference between the time set by the certain time set unit and the further time measured by the time measuring unit, that is, t1002-t1001, and outputs the difference t1002-t1001 to the idle state insertion unit. The idle state insertion unit pauses for executing any operation of the processing unit until the sum of the difference t1002-t1001 calculated by the difference operation unit and an idling period over which the idle state insertion unit outputs a necessary number of no operation (NOP) instructions becomes to be equal to a predetermined specific period, and then resumes its operation. It is assumed that the time when the processing unit resumes its operation is t1003 and the specific period is t1003-t1001.

By the operation described above, that is, by insertion of the suitable number of the idle states which fills a period between a time when the processing unit completes to execute some instruction and the certain time set by the certain time set unit, it is possible to adjust a time when a computer program is started to be execute by the processing unit. Therefore, it becomes possible to reliably start the periodic computer program by the microprocessor at the predetermined interval.

In more detail, the difference t1002-t1001 becomes smaller if the idling period from t1002 to t1003 becomes longer. In contrast, a shorter idling period from t1002 to t1003 results in a larger difference t1002-t1001. Even though an execution speed of the processing unit depends on a condition of the microprocessor such as an access delay generated in accessing a memory, frequency of a clock of the microprocessor, and the like, the specific period can be kept constant irrespective of the execution speed of the processing unit.

However, only adjustment of the specific period between two instructions is taken into consideration in the microprocessor disclosed in Japanese Patent Laid-open No. Hei 5-233277. That is, as to a method for changing the counter value of the time measurement unit according to an instruction defined by a computer program, only the disclosed method is one by which the counter value of the time measurement unit is set to 0 in response to execution of the first instruction which indicates initiating a periodic operation defined by the periodic computer program. Further, the case where the difference t1002-t1001 calculated by the difference operation unit attains a negative value, i.e., an elapsed period between the time t1001 set by the certain time set unit and the further time t1002 measured by the time measuring unit becomes unexpectedly long so as to exceed the specific period t1003-t1001, is not taken into consideration.

Another conventional real-time microprocessor directed to solve the above mentioned problems is disclosed in Japanese Patent Laid-open No. 2000-330785 corresponding to U.S. Pat. No. 7,069,425.

The real-time processor disclosed in Japanese Patent Laid-open No. 2000-330785 corresponding to U.S. Pat. No. 7,069, 425 to Takahashi includes a clock register, a time register, a time comparator, and an instruction processing unit. The clock resister updates a time at a predetermined interval. The time register stores an arbitrary time. The instruction processing unit executes an instruction whose execution status depends on the comparison result obtained by the time comparator. The real-time processor constructed as above can carry out a predetermined operation correctly at a predetermined time irrespective of various factors, such as conditions of a memory and a timer both provided in the real-time processor. For example, the real-time processor of Takahashi can carry out any processing without overflow of the timer which measures the current time, and can detect failure of execution of a predetermined operation at a predetermined time and carry out a recovery procedure. In the real-time processor of Takahashi, the match or magnitude comparison between the value of the clock register and the value of the time register is carried out by the time comparator so as to judge what kind of the status among scheduling standby, scheduling establishment and scheduling violation the real-time microprocessor satisfies. The result of this judgment is used to execute a time dependent instruction by the instruction processing unit. The time dependent instruction includes a condition branch instruction, a memory reference instruction whose execution is temporally delayed, and a qualify instruction which is an instruction to be executed after the currently executing instruction is completed whose execution is temporally delayed.

However, both the microprocessor of Aihara and Hoshino and the real-time processor of Takahashi execute a suitable number of the NOP instruction, in order to start executing the periodic computer program at the predetermined interval. Therefore, the microprocessor and the real-time processor cannot exploit their computational resources.

The inventers of the present application considered that if the microprocessor executes the non-periodic computer program which does not need to start executing at a predetermined interval rather than the idling operation defined by the NOP instruction, it becomes possible to effectively utilize the computational resource of the microprocessor.

However, if it is intended that instead the microprocessor executes the idling operation defined by the NOP instruction the non-periodic computer program is run by the microprocessor, it is necessary that a synchronizing instruction which causes the microprocessor to synchronize two operations, i.e., one defined by a first computer program and a second one defined by the other computer program, have to be inserted into both the first and second computer programs. That is, if it is intended that the periodic computer program which needs to start running at a predetermined interval and the non-periodic computer program which is carried out while the periodic computer program is not processed are alternatively run by the microprocessor, the synchronizing instruction have to be inserted into both the periodic and non-periodic computer programs in order to synchronize the non-periodic operation with the periodic operation. This fact leads to make a development of the computer programs very complex since a programmer who writes the computer programs have to estimate the processing speed of the computer programs and to insert the synchronizing instruction to the computer programs at a suitable line in his development of the periodic and non-periodic computer programs.

Thus, if it is intended that the periodic computer program and the non-periodic computer program are alternatively run by the microprocessor, it can be considered that the microprocessor connects to the external timer circuit configured to outputs an interrupt instruction signal to the CPU of the microprocessor periodically at a predetermined interval in order to start executing the periodic computer program at a predetermined interval and to run the non-periodic computer program while the microprocessor is waiting to start executing the next periodic operation after completing the previous periodic operation.

However, as mentioned above with referring the technologies disclosed in Japanese Patent Laid-open No. Hei 5-233277 and in Japanese Patent Laid-open No. 2000-330785 corresponding to U.S. Pat. No. 7,069,425, the microprocessor cannot execute the interrupt operation directly in response to an input of the interrupt instruction from the external timer circuit according to the condition of the CPU of the microprocessor. As a result of this postponing of the interrupt operation, a delay in starting of the periodic operation is generated. Further, an accumulation of the delays generated at every starting timing results in not only a much delay in executing the periodic operation but also a cancellation of executing the periodic operation.

SUMMARY OF THE INVENTION

In view of above mentioned problems of the prior art, an object of the present invention is to provide a microprocessor configured to be able to carry out a periodic operation defined by a periodic computer program correctly at a predetermined interval while at least one of the periodic operation and a non-periodic operation defined by a non-periodic computer program which can be executed irrespective of a timing to start executing. In other words, it is possible to realize a microprocessor which is configured to start executing the periodic computer program at a predetermined time without any delay. Further, it is possible to realize a microcomputer which is configured to start carrying out a periodic operation defined by a computer program at a predetermined time without any delay.

In more detail, the microprocessor which is adapted to start a second task at the predetermined time when a first task is running if a current time becomes to be equal to the predetermined time is disclosed. The microprocessor executing an instruction read out from a program address updated every time when each execution of instruction is completed, includes update ceasing means for ceasing the program address from being updated when an stopping time comes in order to abort a first task defined by a first computer program and overwriting means for overwriting the program address with an initial address of a second computer program when a predetermined time comes in order to start to execute a second task defined by the second computer program at the predetermined time.

According to a first aspect of the present invention, it is provided a microprocessor having a program counter controlling unit, a time measuring means, a stopping time register, a periodic computer program register, and a program counter unit. The time measuring means counts a number of cycles. One cycle corresponds to an inverse of an operating frequency of the microprocessor. Here, a stopping cycle number is defined as a cycle number indicative to a time when the non-periodic computer program is stopped. The program counter controlling unit is configured to receive both the current number of cycles which is counted and outputted by the time measuring means and the stopping cycle number which is stored and outputted by the stopping time register. The program counter unit stores a program counter.

Then, the program counter controlling unit compares the number of cycles which is counted by the time measuring means and the stopping cycle number which indicates the time when the non-periodic computer program is stopped. If the current number of cycles agrees with the stopping cycle number, the program counter controlling unit sets the program counter to be disabled to update so as to abort the ongoing execution of the non-periodic computer program.

After that, when the number of cycles which is counted by the time measuring means becomes to be equal to a number indicative to a time when one period is elapsed wherein the period is defined as an interval between a time when an execution of the periodic computer program has been started and a further time when the next execution is started, the program counter controlling unit stores a beginning address of the periodic computer program in the periodic program register in order to start the periodic computer program to run.

Therefore, the non-periodic computer program is aborted whenever the number of cycles which is counted by the time measuring means becomes to be equal to a number indicative to a time when the non-periodic computer program is stopped. Thus, there is no running operation executed by the microprocessor when the periodic computer program should start to run. That is, it does not occur that the periodic computer program starts to run while the non-periodic computer program is running. Therefore, it is possible to realize a microprocessor which is configured to accurately start carrying out the periodic operation defined by a computer program at the predetermined time.

Further, in the case where the periodic operation defined by the periodic computer program starts to be executed at the predetermined interval, the non-periodic computer program is interrupted every time before the periodic computer program starts to run. Therefore, it is not necessary for the external timer circuit to issue the interrupt signal towards the microprocessor. Furthermore, it is possible to realize a microcomputer which is configured to start ,carrying out a periodic operation defined by a computer program at a predetermined time without any delay.

According to a second aspect of the present invention, there is provided a microprocessor having the program counter controlling unit, the time measuring means, the stopping time register, the periodic program register, and the program counter unit. The time measuring means counts a number of cycles. Here, a stopping cycle number is defined as a cycle number indicative to a time when the non-periodic computer program is stopped. The program counter controlling unit is configured to receive both the current number of cycles which is counted and outputted by the time measuring means and the stopping cycle number which is stored and outputted by the stopping time register. Then, the program counter controlling unit compares the number of cycles which is counted by the time measuring means and the stopping cycle number which indicates the time when the non-periodic computer program is stopped. If the current number of cycles agrees with the stopping cycle number, the program counter controlling unit sets the program counter to be disable to update so as to abort the ongoing execution of the non-periodic computer program.

Further, a periodic cycle number is defined as a cycle number indicative to a time when one of the periods with a predetermined interval is finished. The program counter controlling unit is configured to receive both the current number of cycles which is counted and outputted by the time measuring means and the periodic cycle number which is stored and outputted by the stopping time register.

Then, the program counter controlling unit compares the number of cycles which is counted by the time measuring means and the period cycle number which indicates the time when one of the periods with a predetermined interval is finished. If the current number of cycles agrees with the period cycle number, the program counter controlling unit sets the program counter to be an initial address of the periodic computer program so as to start the periodic computer program.

Therefore, the non-periodic computer program is aborted when the number of cycles which is counted by the time measuring means becomes to be equal to a number indicative to a time when the non-periodic computer program is stopped. The time when the non-periodic computer program is stopped is set to be before a further time when the periodic computer program starts to run. That is, it is not occurred that the periodic computer program starts to run while the non-periodic computer program is running. Then the periodic computer program starts to run in the manner in which the initial address of the periodic computer program is overwritten in the program counter in the program counter unit. Therefore, it is possible to realize a microcomputer which is configured to accurately start carrying out the periodic operation defined by a computer program at a predetermined time.

Further, the microprocessor has a pipeline architecture in which the periodic and non-periodic computer programs are executed in parallel and, even if a hazard is occurred, the hazard is eliminated by a pipeline stall.

It is preferable that an interval between a time when the non-periodic computer program is aborted and a further time when the periodic computer program should start is equal to a time which is needed to perform the pipeline stall so as to eliminate the hazard.

Further the microprocessor has an external memory. When the program counter controlling unit stops to be update the program counter so as to abort the non-periodic computer program, the last value of the program counter is moved to the external memory. Then, after the periodic computer program is completed to be executed, the program counter controlling unit transfers the value of the program counter from the external memory to the program counter unit so as to resume the non-periodic computer program at the line where the last execution is interrupted. Therefore, it is possible to restart the operation of the non-periodic computer program at an instruction which is the last one of the previous operation of the non-periodic computer program besides the periodic computer program can start to run at a predetermined interval.

Further it is preferable that the microprocessor has a program counter buffer which can memorize a history of instructions by storing a history of program addresses.

Using the program counter buffer, the program counter controlling unit is configured to choose some program addresses among those stored in the program counter buffer and to move those to the external memory. After an execution of the periodic computer program is completed, the program counter controlling unit moves one program address from the external memory to the program counter unit so as to start an operation fetched from the program address. If the history of the program addresses stored in the program counter buffer is a reflection of the execution of the non-periodic computer program, it is possible to restart the operation of the non-periodic computer program at an instruction which is the last one of the previous operation of the non-periodic computer program besides the periodic computer program can start to run at a predetermined interval.

According to a second aspect of the present invention, it is provided a microprocessor having the program counter buffer for memorizing a history of the program addresses which are passed on the program counter unit.

The program counter controlling unit decides not to execute an instruction which is defined by the non-periodic computer program and is read from the program address stored in the program address counter when the current number of cycles which is counted and outputted by the time measuring means becomes to be equal to the end number of cycles which indicates the end of one period. The periodic computer program is set to start every beginning of the period.

Then, the program counter controlling unit calculates reverse cycles over which the program counter should be ascended before the periodic computer program will be resumed to be executed, and chooses a program address corresponding to that located at the program counter unit before the end number of cycles which indicates the end of one period by the reverse cycles.

After that, when the number of cycles which is counted by the time measuring means becomes to be equal to a number indicative to a time when new period is started, the program counter controlling unit stores a beginning address of the periodic computer program in the periodic program register in order to start the periodic computer program to run.

Therefore, it is possible to realize a microprocessor which is configured to accurately start carrying out the periodic operation defined by a computer program at the predetermined time.

Further, in the case where the periodic operation defined by the periodic computer program starts to be executed at the predetermined interval, a history of the program addresses before new period will be started are stored in the program counter buffer. It is possible to shorten a waiting time from a time when the non-periodic computer program stops to run to a further time when the periodic computer program starts to run. It is preferable that the program counter buffer is provided on the central processing unit in order to be speedy accessed from the program counter controlling unit.

According to a fifth aspect of the present invention, there is provided an instruction executing method by a microprocessor having a program address unit storing a program address updated every time when each execution of instruction is completed, the instruction being read out from the program address unit, comprising steps of: ceasing the program address from being updated when a stopping time comes in order to abort a first task defined by a first computer program, and overwriting the program address with an initial address of a second computer program when a predetermined time comes in order to start to execute a second task defined by the second computer program at the predetermined time.

Therefore, it is possible to accurately start carrying out the periodic operation defined by a computer program at the predetermined time without any delay.

It is preferable that the instruction executing method, wherein the microprocessor further comprising memorizing means, further comprising steps of: generating a maximum instruction operating time which needs to be elapsed from the stopping time when updating of the program address is ceased to a completion time when a last instruction read out from the last value of the program address before the stopping time is completed, and generating a maximum wait time which is required to elapse for memorizing data related to the last instruction in the memorizing means, wherein an interval between the stopping time and the predetermined time is equal to a sum of the maximum instruction operating time and the maximum wait time.

BRIEF DESCRIPTION OF THE DRAWINGS

Other objects and the features of the present invention will become more apparent from the following detailed description of the preferred embodiment taken in conjunction with the accompanying drawings in which:

FIG. 15 is a time chart showing a processing sequence according to the eighth embodiment when a program executed by the CPU is changed from a non-periodic computer program to a periodic computer program.

DETAILED DESCRIPTION OF THE PREFERRED EMBODIMENTS

Various embodiments of the present invention will now be described hereafter with references to accompanying drawings.

First Embodiment

Referring to the accompanying drawings, hereinafter will be described a first embodiment of the present invention. A microprocessor according to the first embodiment corresponds to a CPU (central processing unit) constituting a so-called microcomputer which carries out desired processes by executing a periodic process defined by a periodic computer program (hereinafter the periodic process be referred to as a "periodic computer program" for simplicity) and a non-periodic process defined by a non-periodic computer program (hereinafter the non-periodic process be referred to as a "non-periodic computer program" for simplicity).

Specifically, the microprocessor periodically executes the periodic computer program, and sequentially executes the non-periodic computer program between the executions of the periodic computer programs. In order to perform the periodic computer program, a computer program for producing a periodic pulse for PWM (pulse width modulation) control, for taking a count with a timer, and for performing communication processing, for example, is executed. Alternatively, in order to perform the non-periodic computer program, a computer program for executing an application that does not require periodic execution, for example, is executed.

Figure 1:
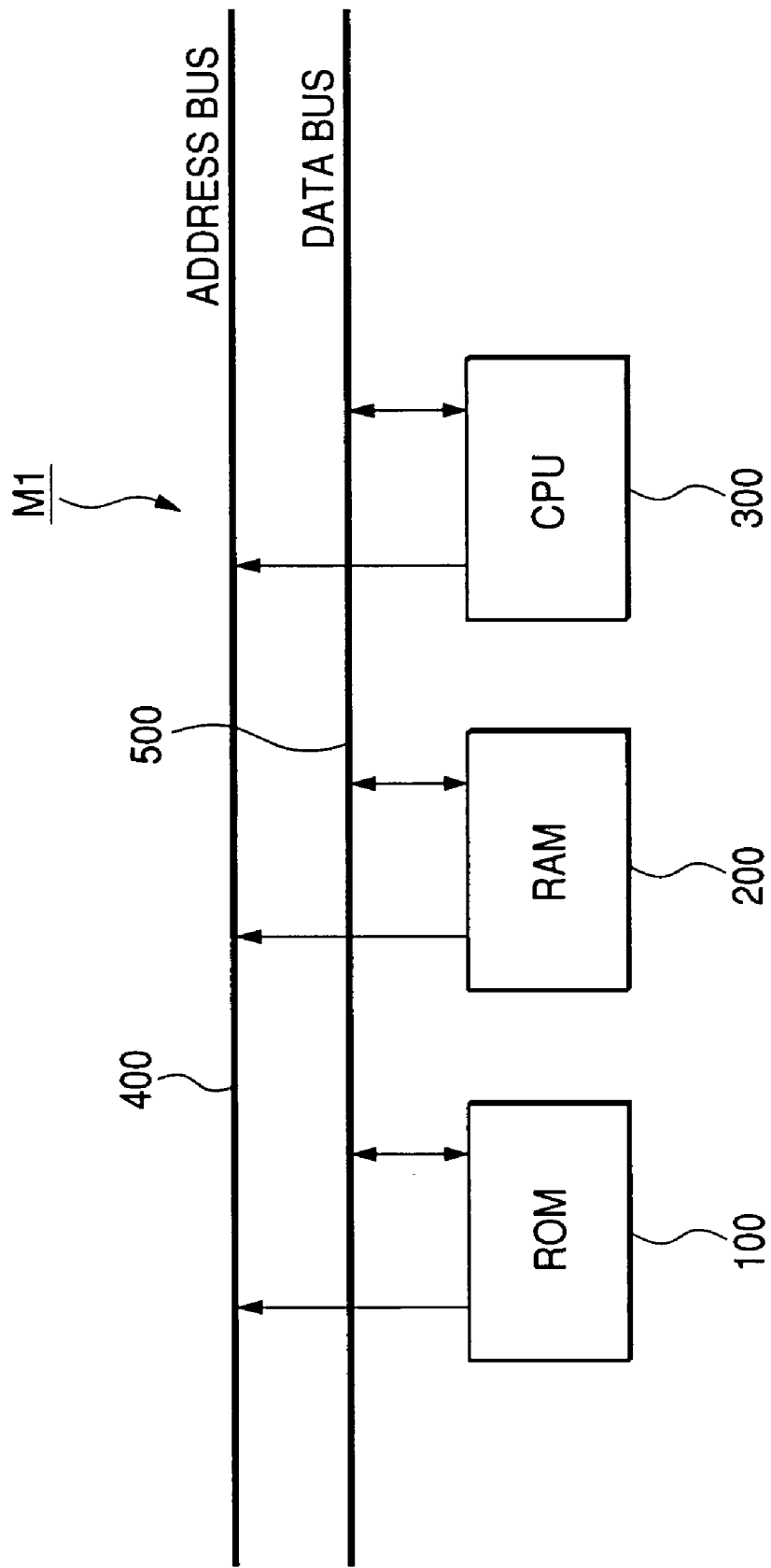
FIG. 1 is a block diagram showing a schematic structure of a microcomputer according to a first embodiment of the present invention.

FIG. 1 is a block diagram of the microcomputer according to the first embodiment of the present invention. As shown in FIG. 1, a microcomputer M1 includes a ROM 100 (corresponding to the first memory means of the present invention), a RAM 200 (corresponding to the second memory means of the present invention) and a central processing unit (CPU) 300. Each of these components is connected to an address bus 400 used for transmitting an address of a running computer program and a data bus 500 used for transmitting data between these components.

The ROM 100 is a read-only recording medium. The ROM 100 is written with the periodic computer program by which the microcomputer M1 can allow an equipped product to execute the periodic process mentioned above, and the non-periodic computer program as an application by which the microcomputer M1 can realize functions or the like of the equipped product. These programs are adapted to be read out by the CPU 300 for execution.

The RAM 200 is a rewritable storage medium, which is used for the CPU 300 to write/read data in executing the periodic or non-periodic computer program.

The CPU 300 periodically starts to execute the periodic computer program stored in the ROM 100 at a predetermined interval. The CPU 300 executes the non-periodic computer program between the executions of the periodic computer programs. In particular, the CPU 300 reads out the computer programs incorporated in the ROM 100 through the address bus 400 and the data bus 500. Then, the computer programs are interprets as sequential instructions by the CPU 300. The CPU 300 performs transfer, calculation and processing, for example, of data according the sequential instructions defined by the computer programs read out from the ROM 100.

Figure 2:
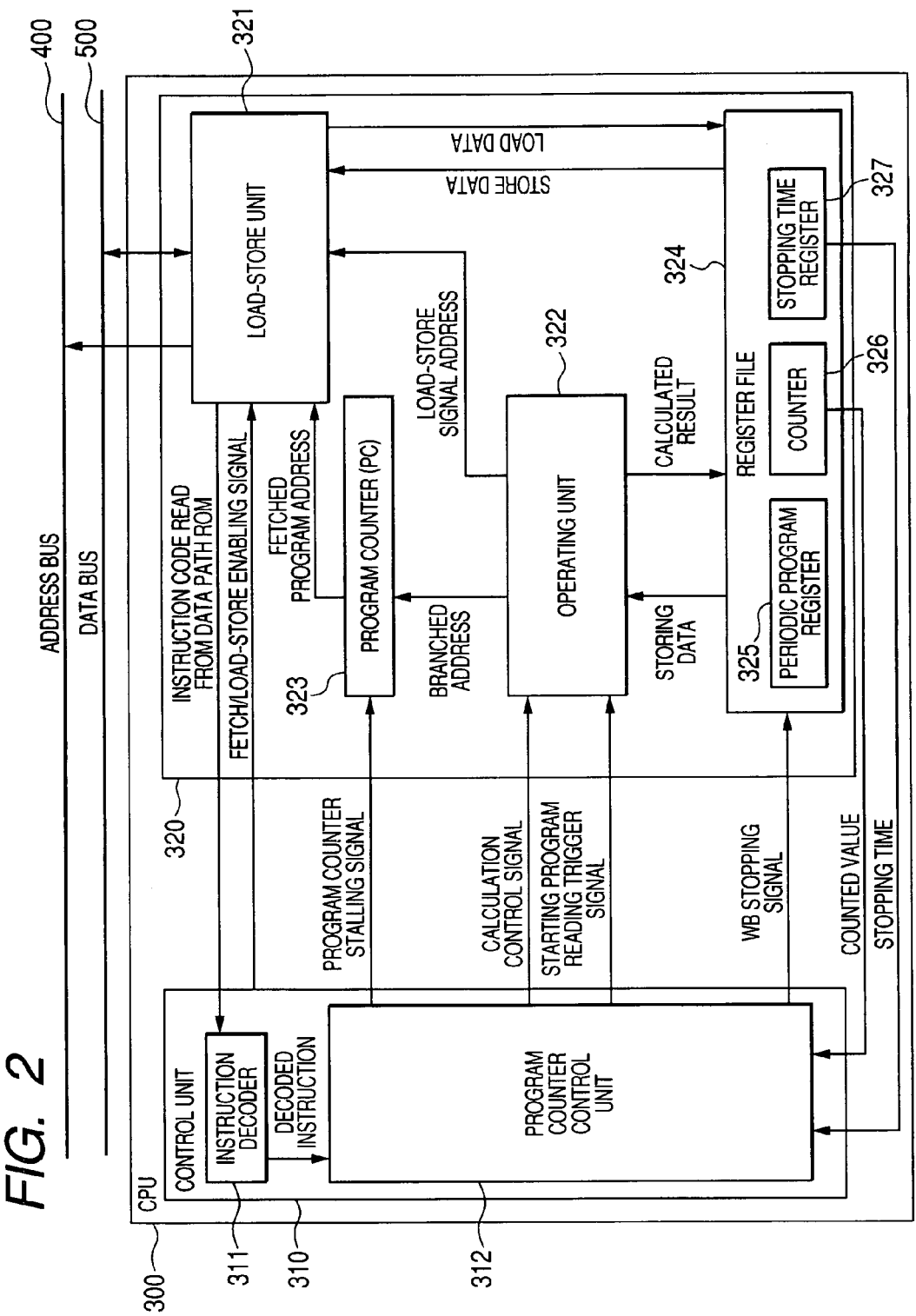
FIG. 2 is a block diagram showing a schematic structure of a central processing unit (CPU) according to a first embodiment of the present invention.

FIG. 2 is a block diagram of the CPU 300 according to the first embodiment of the present invention. The CPU 300 includes a control unit 310 for controlling execution conditions of the programs, and a data path 320 for storing data and performing arithmetic/logical operation.

The control unit 310 includes an instruction decoder 311 and a program counter control unit 312. The instruction decoder 311 stores, through the data path 320, an instruction code indicated by the program, which has been retrieved from the ROM 100, and decodes the retrieved instruction code. The program counter control unit 312 controls the data path 320 by outputting an operation control signal, based on the instruction that has been decoded by the instruction decoder 311.

The data path 320 includes a load/store unit 321, an execution unit 322, a program counter unit (hereinafter referred to as a "program counter (PC)") 323 and a register file 324.

The load/store unit 321 controls reading of data from a unit (e.g., ROM 100) external to the CPU 300 and writing of data into a unit (e.g., RAM 200) external to the CPU 300. The execution unit 322 executes arithmetic/logical operation in response to the operation control signal inputted from the program counter control unit 312, according to the instruction code decoded by the instruction decoder 311.

The PC 323 stores a program counter indicating a fetch program address of an instruction to be subsequently executed, which is stored in the ROM 100. Specifically, when the CPU 300 reads out an instruction (program) from the ROM 100, a fetch program address for reading out the instruction is outputted to the address bus 400 from the PC 323 through the load/store unit 321. It is so configured that, every time the CPU 300 reads out an instruction from the ROM 100, a value of the fetch program address indicated by the program counter stored in the PC 323 is incremented by that much of the read-out instruction.

The register file 324 stores data resulting from the execution unit 322 or data retrieved from a unit external to the CPU 300. The register file 324 includes a periodic program register 325 for storing an initial address of the periodic computer program that requires accuracy in the timing for executing the program, a counter 326 (corresponding to the time measuring means of the present invention) for performing countdown in synchronization with a machine cycle, and a stop timing register 327 for storing stop timing of the non-periodic computer program that does not require accuracy in the timing for executing the program.

Figure 3:
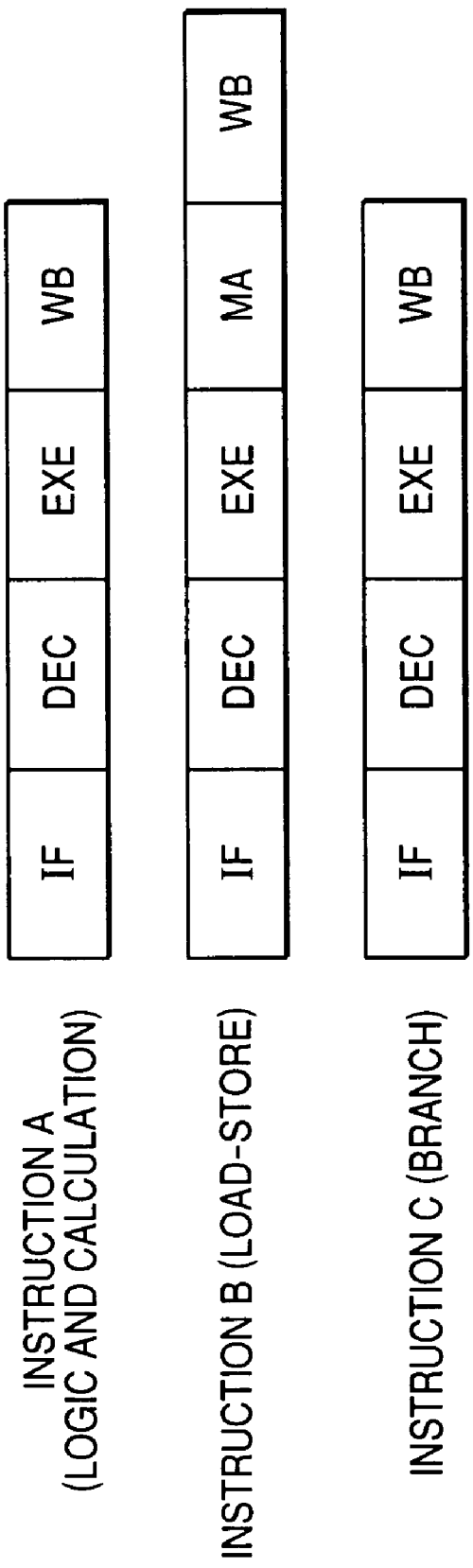
FIG. 3 shows a list of instructions executed by the CPU.

The microcomputer M1 according to the present embodiment is configured as described above. In the microcomputer M1 having such a configuration, the CPU 300 is adapted to perform a pipeline process made up of: an IF (fetching) stage for reading an instruction from a memory (e.g., ROM 100); a DEC (decoding) stage for decoding the instruction; an EXE (executing) stage for executing an address operation, such as arithmetic operation and memory accessing, according to the decoded instruction; an MA (memory accessing) stage for reading/writing data from/into a memory (e.g., RAM 200); and a WB (writing back) stage for writing the results obtained by performing reading from the memory or by performing the arithmetic operation, into a register (e.g., register file 324). Referring to FIG. 3, the pipeline process will be described.

FIG. 3 shows an example of the pipeline process executed by the CPU 300. The present embodiment classifies the instructions executed by the CPU 300 into three categories as follows:

(1) Logic/Arithmetic Instructions A:

Instructions not requiring access to the RAM 200 or the ROM 100, but to read out data stored in the register file 324 for operation, and to write the results of the operation into the register file 324.

(2) Load/Store Instructions B:

Load instructions: Instructions to read out load data to be written into the register file 3124 from an external memory (ROM 100) of the CPU 300;

Store instructions: Instructions to write data from the register file 324 into the external memory (RAM 200).

(3) Branch Instructions C:

Instructions to retrieve a branch address from the data stored in the register file 324 and to write the address into the PC 323, and to store the address of the PC 323 as a save PC into the register file 324, the address being the address before the branch address is written (i.e., instructions to change the address of the PC 323 to change the order of instructions of the program).

Among the instructions mentioned above, it is so configured that one instruction is processed in a 4-cycle period for instructions A and C, and in a 5-cycle period for instructions B. The programs are made up according to these instructions, stored in the ROM 100, and processed by the CPU 300, as shown in FIG. 4.

Figure 4:
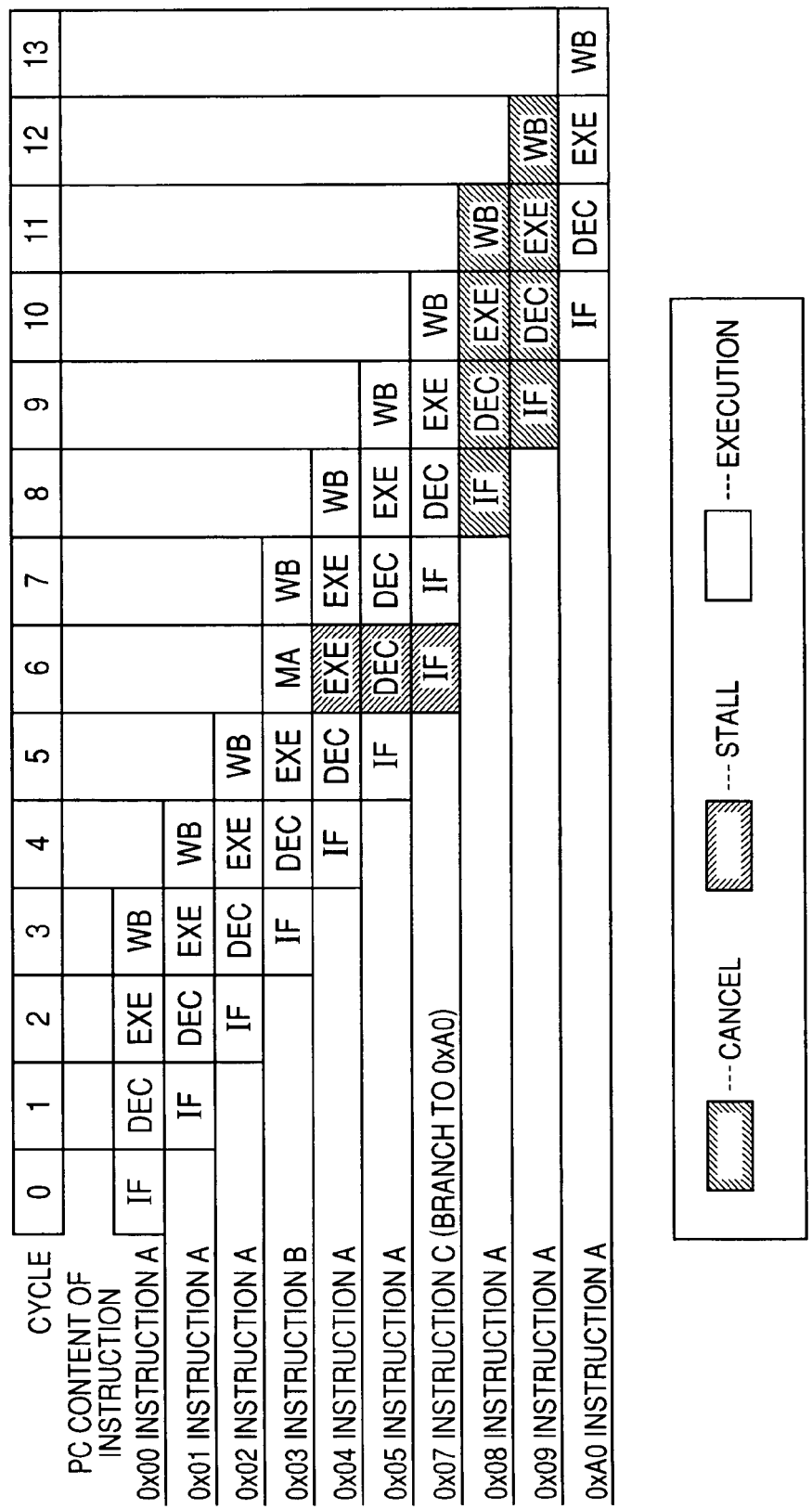
FIG. 4 shows a time chart showing an example of a pipeline operation executed by the CPU.

Specifically, when the address indicated by the PC 323 is "0x00" in cycle "0" shown in FIG. 4, the IF stage is executed. In particular, the fetch program address indicative of the address "0x00" is inputted to the ROM 100 from the PC 323 through the load/store unit 321 and the address bus 400. Then, an instruction at the address "0x00" in the program stored in the ROM 100 is inputted to the CPU 300 through the data path 320. When the CPU 300 has read out the instruction A at the address "0x00" from the ROM 100, a value of the fetch program address in the PC 323 is incremented to "0x01".

In cycle "1", the DEC stage is executed for the instruction A at the address "0x00". In particular, the instruction is decoded by the decoder 311 in the CPU 300 shown in FIG. 2, and the decoded instruction is inputted to the program counter control unit 312. As to the address "0x01" in the PC 323, the IF stage for the instruction A is executed in the same fashion as described above.

Subsequently, in cycle "2", the EXE stage is executed for the instruction A at the address "0x00". In particular, an operation control signal is inputted to the execution unit 322 from the program counter control unit 312 to execute an operation according to the instruction. As to the instruction A at the address "0x01", the DEC stage is executed in the same fashion as described above. Further, as to the address "0x02" in the PC 323, the IF stage for the instruction A is executed in the same fashion as described above.

In cycle "3", the WB stage is executed as to the instruction A at the address "0x00". In particular, the results of the operation executed in the execution unit 322 are written into the register file 324. As to the instruction A at the address "0x01", the EXE stage is executed in the same fashion as described above. As to the instruction A at the address "0x02", the DEC stage is executed in the same fashion as described above. Further, as to the address "0x03" in the PC 323, the IF stage for the instruction B is executed. In this way, as the cycle progresses, the individual stages for the above addresses are sequentially executed.

When the instruction B at the address "0x03" is executed, the MA stage is executed after the EXE stage. In this case, the stages for lower-order addresses (the EXE stage for the instruction A at an address "0x04", the DEC stage for the instruction A at an address "0x05" and the IF stage for the instruction C at an address "0x07" (branched to "0xA0") in the example shown in FIG. 4) are stalled and not executed, which stages are to be executed in the same cycle (cycle "6") as the MA stage for the address "0x03".

Specifically, while the MA stage for the instruction B at the address "0x03" is executed (cycle 6), a program counter stall signal is inputted to the PC 323 from the program counter control unit 312 to stop renewal of the address in the PC 323. Also, a fetch and load/store enabling signal is inputted to the load/store unit 321 from the control unit 310 to effect control for enabling load/store, whereby the pipeline for other instructions is stalled. This requires two cycles, but conflict between the IF stage and the MA stage can be avoided only for the instructions necessary for memory access.

The reason for avoiding conflict between the IF stage and the MA stage is that the data path 320 is occupied by the MA stage when data is written into the RAM 200 from the CPU 300, and that other instruction stages cannot use the data path 320. The stages in cycle "6" stalled in this way are executed in the subsequent cycle "7".

Specifically, the IF stage for the instruction C at an address "0x07" is executed in cycle "7". In this case, at the WB stage for the address "0x03", the value in the PC 323 is rewritten to the address "0xA0" for branching. Accordingly, the instructions A for the addresses "0x08" and "0x09" shown in FIG. 4 are abandoned, whereby a WB stop signal is produced by the program counter control unit 312 and inputted to the register file 324. As a result, data writing from the execution unit 322 into the register file 324 is stopped. Also, a fetch and load/store enabling signal is inputted to the load/store unit 321 from the control unit 310 to effect control in such a way that only the IF stage will be enabled at the load/store unit 321. In this way, the instructions at the branched address "0xA0" and the subsequent addresses are executed.

An example of the pipeline process has so far been described, in which the CPU 300 has executed the instructions of the programs as the cycle progresses.

Hereinafter will be described an operation in the CPU 300, which performs the pipeline process as described above, for periodically performing the periodic computer program with no offset between execution cycles. In the present embodiment, a description will be focused on a periodic computer program which is required to be operated in every 50-cycle period.

Figure 5:
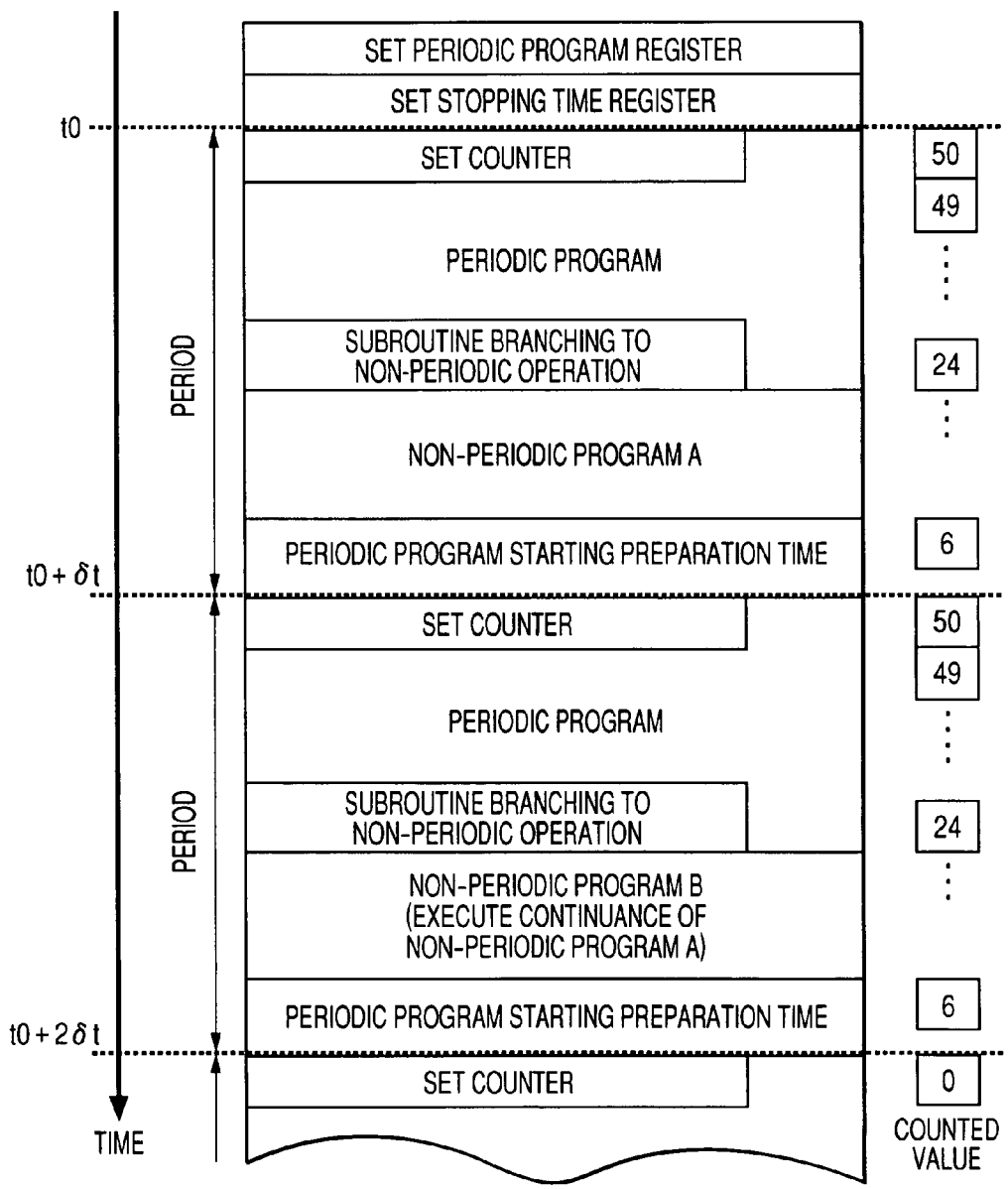
FIG. 5 is a time chart showing a processing sequence according to the first embodiment when a program executed by the CPU is changed from a non-periodic computer program to a periodic computer program.

FIG. 5 illustrates the contents of the periodic computer program to be periodically executed. As shown in the figure, the present embodiment is configured to execute a program for setting the periodic program register 325, and a program for setting the stop timing register 327, as well as the periodic computer program and the non-periodic computer program. In these programs, the programs for setting the periodic program register 325 and for setting the stop timing register 327 are only at the startup of the CPU 300. Then, the periodic and non-periodic computer programs are repeatedly executed. These programs are stored in the ROM 100.

Specifically, in executing the periodic and non-periodic computer programs, the program for setting the periodic program register 325 is executed with an address (address for making an access to the ROM 100 from the CPU 300) of the program which is executed immediately after the CPU 300 is reset (or immediately after power is supplied to the CPU 300). The program for setting the periodic program register 325 is a program for executing an instruction for setting the periodic program register, i.e. a program for writing an initial address of the periodic computer program into the periodic program register 325, so that the periodic computer program is periodically executed.

As described above, the program for setting the periodic program register 325 has an address, e.g. "0x00". This program is executed by allowing the CPU 300 to access the ROM 100 and read out the address therefrom.

Subsequently, the program for setting the stop timing register 327 is executed. The program for setting the stop timing register 327 is a program for executing an instruction for setting the stop timing register, i.e. an instruction for writing a preparation period for starting up periodic computer program (hereinafter referred to just as a "preparation period") into the stop timing register 327. The preparation period is a period from when the non-periodic computer program has been stopped, to when the periodic computer program is started.

In the present embodiment, stop timing is defined as being "the maximum number of process cycles+the number of cycles required for saving a restart address of the non-periodic process". The maximum number of process cycles corresponds to the number of cycles from the DEC stage to the MA stage.

According to the definition, the preparation period in the present embodiment is six cycles, for example, and the preparation period is inputted to the program counter control unit 312 as the stop timing. The address of the program for setting the periodic program register 325 is "0x02", for example.

Subsequently, the periodic computer program is executed. The periodic computer program is made up of an instruction to set counter, an instruction to execute the periodic computer program after the counter setting, and an instruction to branch to the non-periodic process after the periodic computer program.

The instruction to set counter is an instruction to set start timing, i.e. an instruction to set a count at the counter 326, for counting cycles for performing the periodic computer program. With the execution of this instruction, a count ("50" in the present embodiment) is written into the counter 326 in the register file 324. At the same time, a countdown is started and the count is inputted to the program counter control unit 312.

After executing the instruction to set counter, the periodic computer program is executed according to the instruction to execute the periodic computer program. As described above, the periodic computer program is a program for producing a periodic pulse for PWM control, or for taking a count with a timer. During the execution of the periodic computer program, a countdown is carried out at the counter 326.

After completing the periodic computer program, the instruction to start the non-periodic computer program, i.e. the instruction to branch to the non-periodic computer program, is executed. Then, the non-periodic computer program is started. As described above, the non-periodic computer program is a program for executing an application. The non-periodic computer program is executed with the countdown of the counter 326. The preparation period is started from the cycle where a value at the stop timing register 327 ("6" in the present embodiment) matches the count value at the counter 326.

Figure 6:
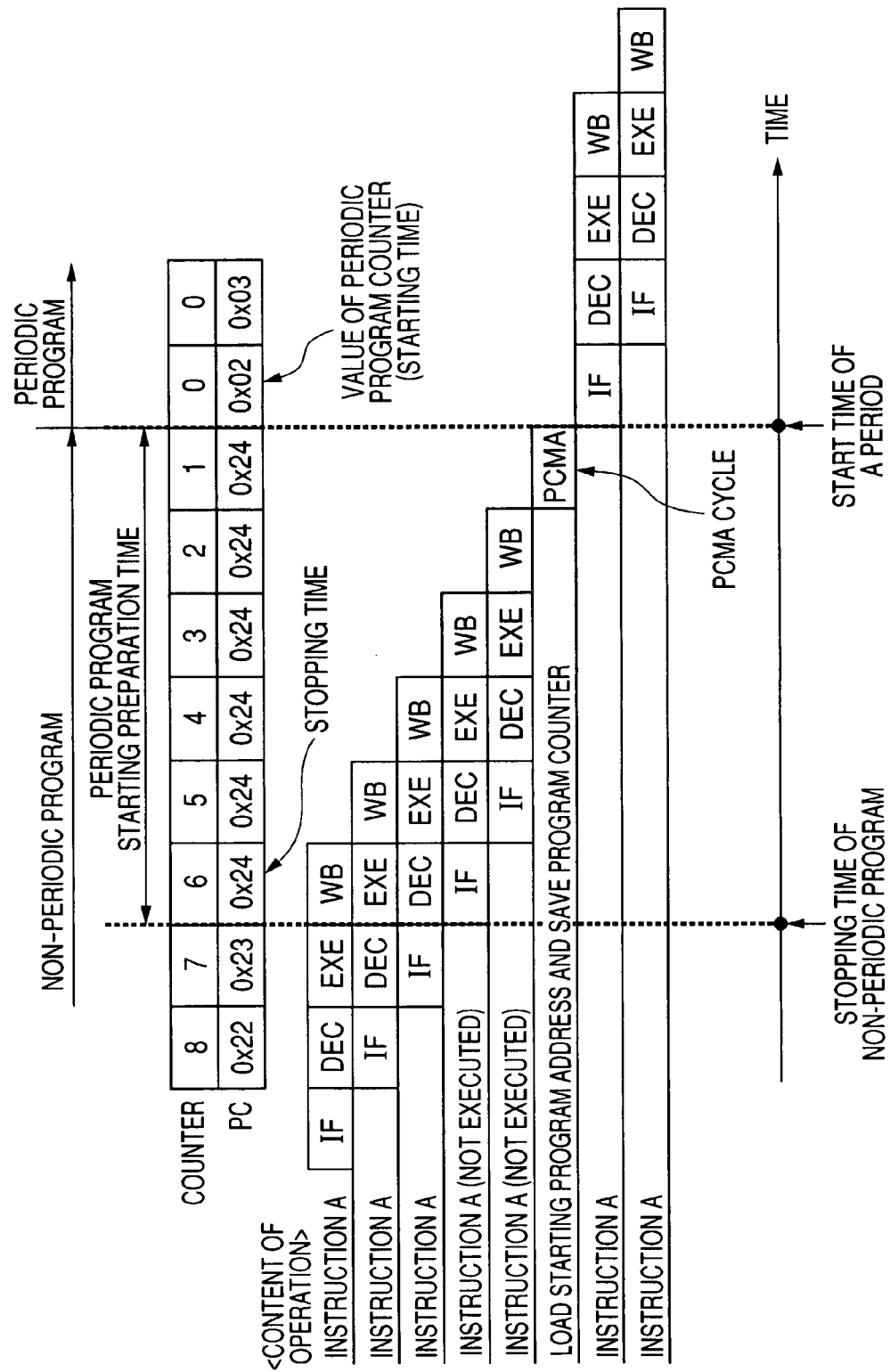
FIG. 6 is a time chart showing a processing sequence according to a second embodiment when a program executed by the CPU is changed from a non-periodic computer program to a periodic computer program.

Referring to FIG. 6, a processing sequence in the preparation period is explained. FIG. 6 illustrates a processing sequence for switching the non-periodic computer program to the periodic computer program. As shown in the figure, in a first cycle of the preparation period (count "6", or stop timing, in FIG. 6), a PC stall signal is inputted to the PC 323 from the program counter control unit 312 to stop renewal of the count at the PC 323 and to stop an instruction fetch operation. Thus, at the time point of the first cycle in the preparation period, the instructions for the DEC stage and the subsequent stages currently in execution are ordinarily executed up to the stage WB.

When the WB stage of a branch instruction is executed during the processes of a non-periodic process stopping sequence, the value at the PC 323 is rewritten to a branch address earlier than the inputting of the PC stall signal, in the same fashion as in executing an ordinary branch instruction. Then, the subsequent instructions are abandoned. Subsequently, a WB stop signal is inputted to the register file 324 from the program counter control unit 312. Then, a fetch and load/store stop signal is inputted to the load/store unit 321 from the control unit 310. Thus, memory writing and the WB stage are inhibited.

When the count at the counter 326 is "1", a trigger signal for reading program to be started is issued to the execution unit 322 from the program counter control unit 312. In the execution unit 322, the value of the periodic program register is loaded on the PC 323. The address (final address of the non-periodic computer program; save PC) that has been written into the PC 323 at the time point of the count "1" is written into the RAM 200 (PCMA) through the execution unit 322 and the load/store unit 321. When the count is "0", the program is started from the same address as the one written into the periodic program register 325.

In this way, one cycle can be reliably finished and then the periodic computer program is executed again. When branching to the non-periodic computer program is performed, the final address of the previously executed non-periodic computer program A is written into the register file 324 from the RAM 200 through the load/store unit 321. The address is then written into the PC 323 as a storage data through the execution unit 322. Thus, the non-periodic computer program B shown in FIG. 5 is executed as a continuation of the non-periodic computer program A. Afterward, the periodic computer program and the non-periodic computer program are repeatedly executed periodically.

As described above, in the present embodiment, when the periodic and non-periodic computer programs are executed by the CPU 300 within a period made up of a constant number of counts, the non-periodic computer program can be executed immediately after the periodic computer program is finished. After executing the non-periodic computer program, when the count in the period has reached a certain value, leaving remnant counts for stopping the non-periodic computer program (stop timing), the remnant counts are used as the preparation period. During this preparation period, the non-periodic computer program is interrupted, so that the periodic computer program can be periodically executed. This way of executing the periodic and non-periodic computer programs constitutes a feature of the present embodiment.

By executing the periodic and non-periodic computer programs as described above, a complicated procedure for developing programs can be mitigated. In particular, by stopping the non-periodic computer program at the stop timing, the periodic computer program can be periodically executed without requiring an interrupt signal for periodically executing the periodic computer program. Thus, the periodic execution of the periodic computer program will not be delayed, whereby the periodic process can be reliably executed periodically.

Further, since the non-periodic computer program can be executed immediately after the periodic computer program is finished, idling period of the CPU 300 can be eliminated, while effectively utilizing the performance of the CPU 300.

Second Embodiment

Hereinafter will be described a second embodiment of the present invention. In the second and the subsequent embodiments, the identical or similar components to those shown in the first embodiment are given the same reference numerals for the sake of omitting explanation. In the second embodiment, only the differences from the first embodiment will be described. In particular, a description is provided on the processing performed during the preparation period, in case some of the instructions making up the non-periodic computer program may include the MA stage.

Figure 7:
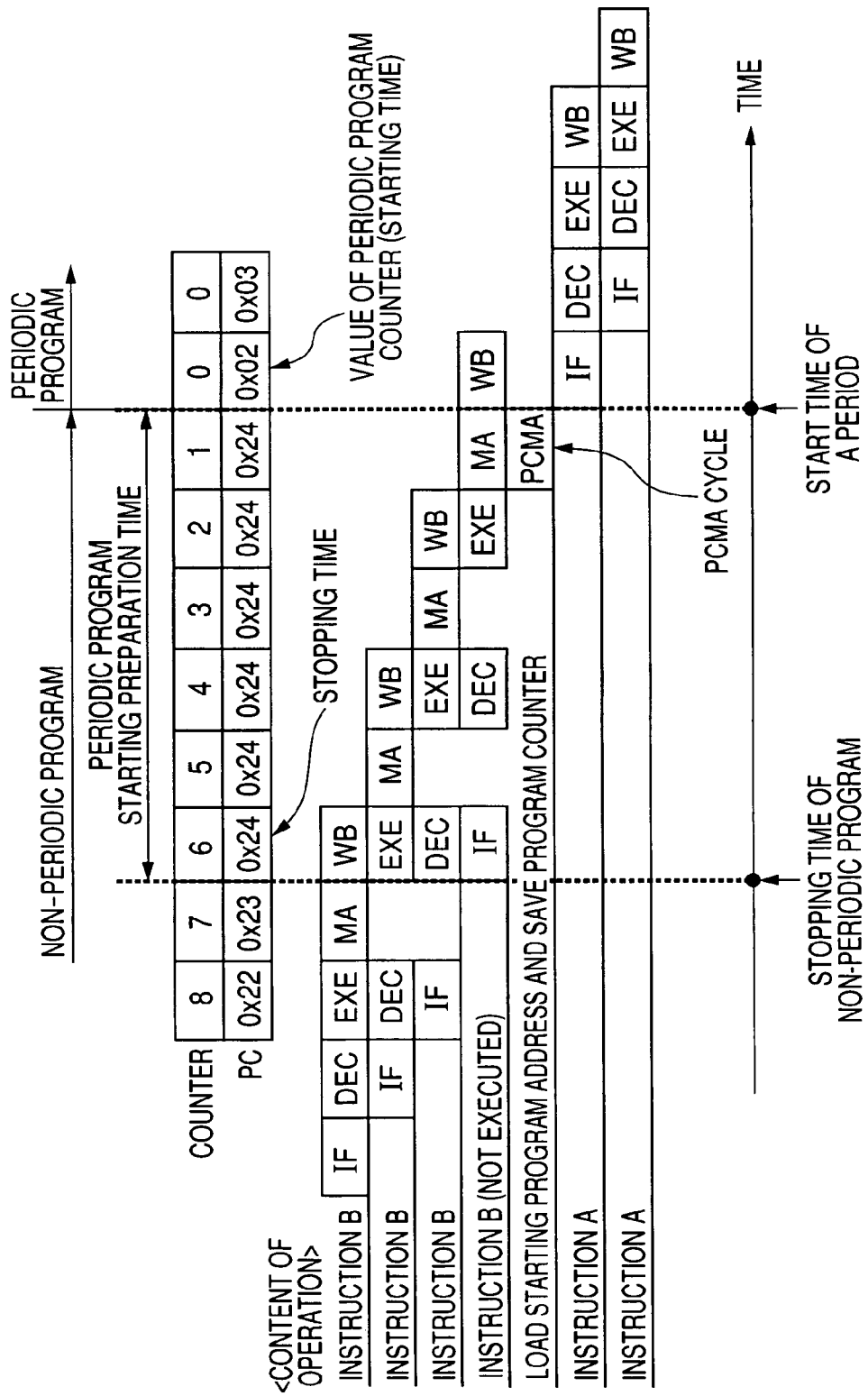
FIG. 7 is a time chart showing a processing sequence according to a third embodiment when a program executed by the CPU is changed from a non-periodic computer program to a periodic computer program.

FIG. 7 illustrates a processing sequence according to the present embodiment for switching the non-periodic computer program to the periodic computer program. Similar to the first embodiment, in a first cycle (count "6", or stop timing, in FIG. 7) of the preparation period, a PC stall signal is inputted to the PC 323 from the program counter control unit 312 to stop renewal of the value of the PC 323 and to stop an instruction fetch operation. Thus, even when the MA stage is included in an instruction, in other words, as to an instruction which executes the DEC stage during the preparation period, the instruction is ordinarily executed up to the WB stage.

However, as to the instruction that executes the IF stage during the preparation period, an address (save PC) of the subject instruction, which has been written into the PC 323 at the count "1" of the counter 326, is saved by being written into the RAM 200, in a PCMA cycle, through the execution unit 322 and the road store unit 321. Thus, when the non-periodic computer program is executed in the subsequent period, instruction can be executed from the one having the saved address.

Thus, even when the MA stage is included in an instruction, the non-periodic computer program can be interrupted during the preparation period and then the periodic computer program can be periodically executed.

Third Embodiment

Hereinafter will be described a third embodiment of the present invention. In the present embodiment only the differences from the first and second embodiments are described. Specifically, a description will be provided here on a process performed during the preparation period, in case an instruction to branch the non-periodic computer program is executed during the preparation period.

Figure 8:
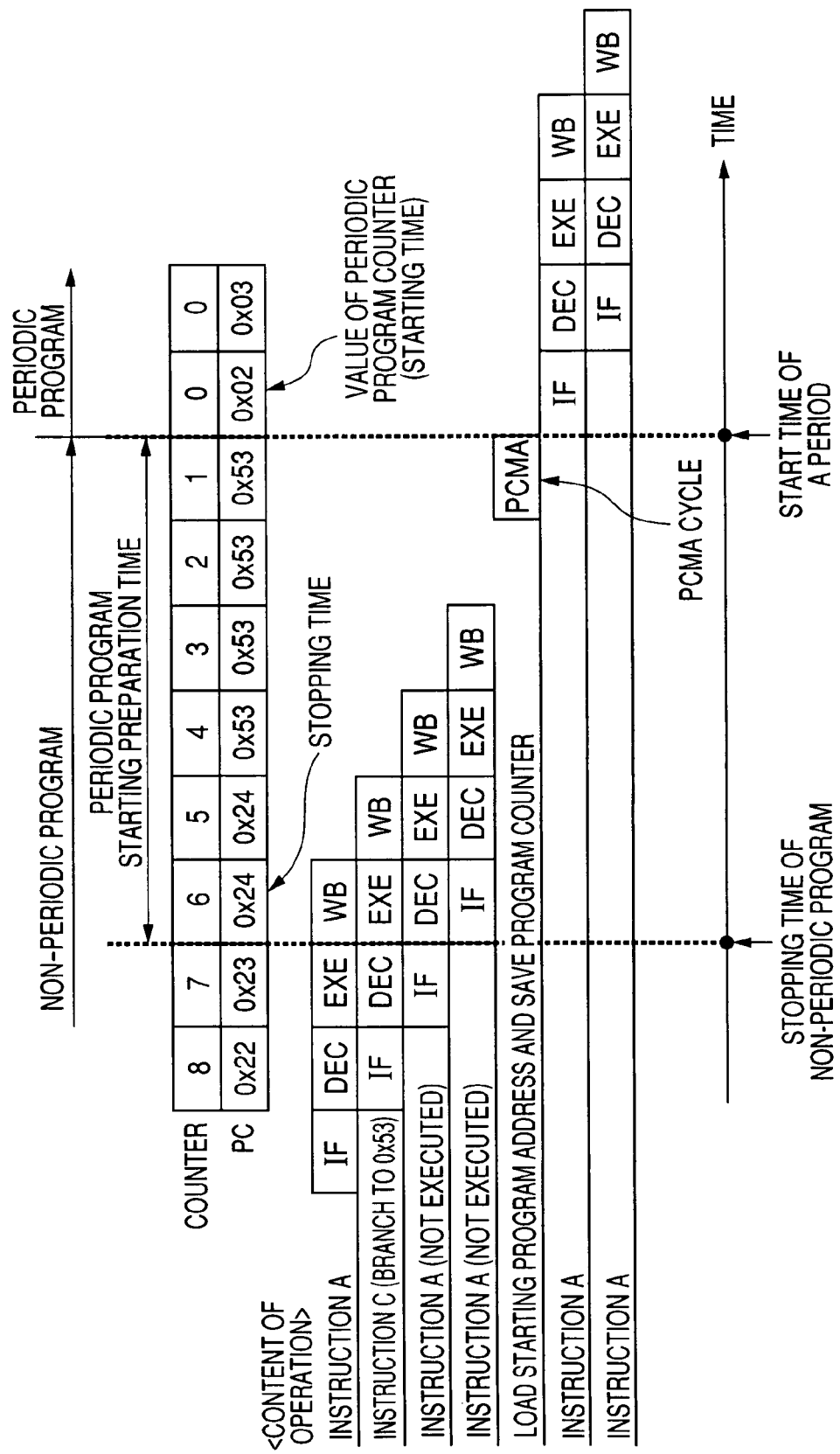
FIG. 8 is a time chart showing a processing sequence according to a third embodiment when a program executed by the CPU is changed from a non-periodic computer program to a periodic computer program.

FIG. 8 illustrates a processing sequence according to the present embodiment for switching the non-periodic computer program to the periodic computer program. As shown in the figure, when the branch instruction C (branched to "0x53") is executed, the EXE stage of the branch instruction is performed in a first cycle (count "6") of the preparation period. As a matter of course, the instruction A that follows the branch instruction C is not executed.

In this case, with the execution of the EXE stage of the branch instruction C, the address indicated by the PC 323 in a second cycle (count "5") of the preparation period is changed to a branch address. Then, the branch address (save PC), which has been written into the PC 323 at the count "1" of the counter 326, is saved in the PCMA cycle by being written into the RAM 200 through the execution unit 322 and the road store unit 321. Thus, when the non-periodic computer program is executed in the subsequent period, instruction can be executed from the one having the branch address.

In this way, even when the branch instruction is executed during the preparation period, instruction can be executed from the branch address in executing the non-periodic computer program in the subsequent cycle.

Fourth Embodiment

Hereinafter is described a fourth embodiment of the present invention. In the present embodiment, only the differences from the above embodiments will be described. In the embodiments described above, the stop timing has been set before starting the periodic computer program. The stop timing can be optionally set by a program developer. Accordingly, when the stop timing is set at "3", for example, the count of the counter 326 will be "0" before completing the WB stage of the instruction which is executed at the count of "1". Therefore, the non-periodic computer program is expected not to be normally stopped. Thus, it is a feature of the present embodiment that a stop timing producing unit is provided for normally stopping the non-periodic computer program.

Figure 9:
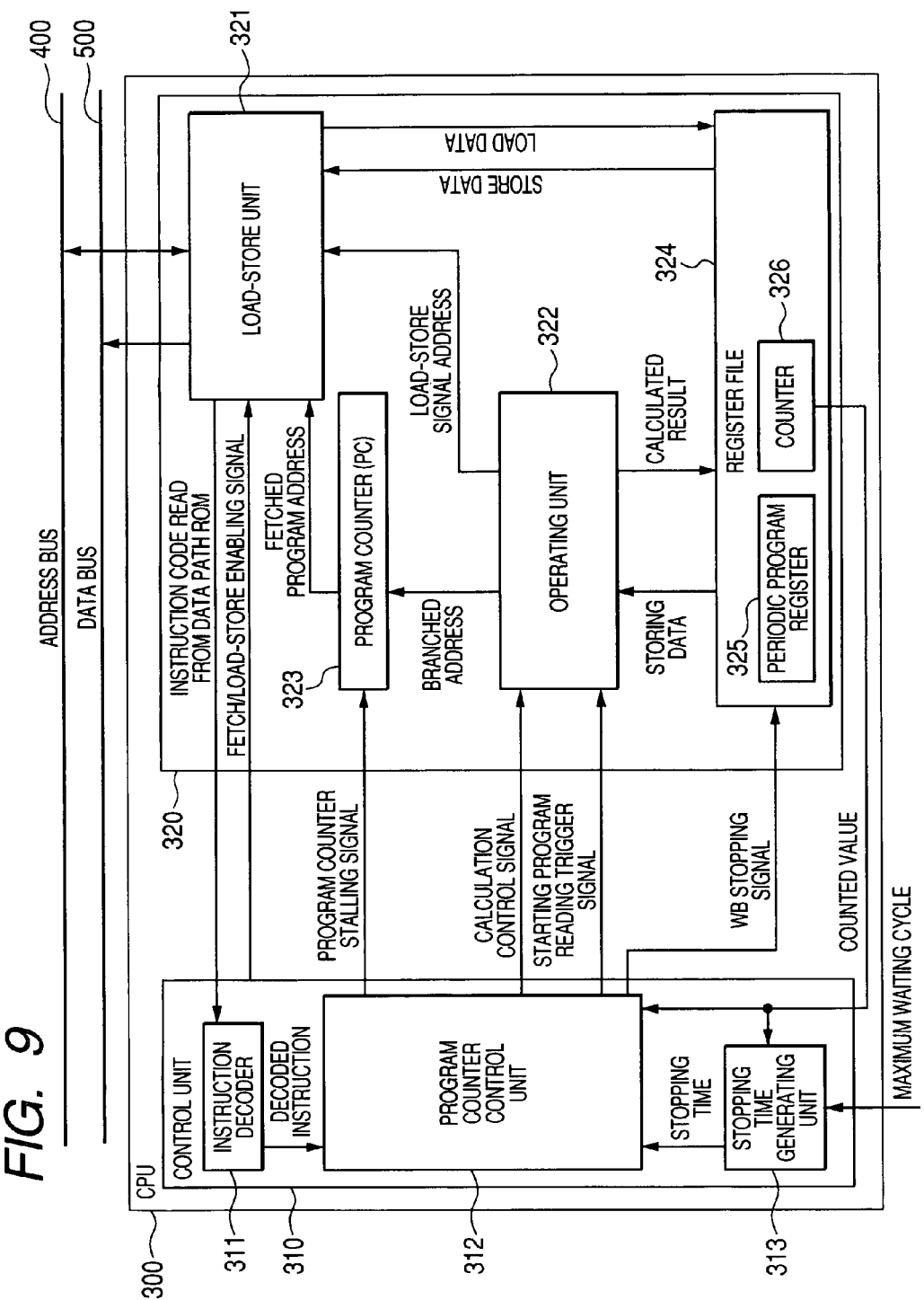
FIG. 9 is a block diagram showing a schematic structure of a central processing unit (CPU) according to a fourth embodiment of the present invention.

FIG. 9 is a block diagram of a CPU according to the present embodiment. As shown in FIG. 8, unlike the CPU 300 of the first embodiment shown in FIG. 1, the control unit 310 of the present embodiment is provided with a stop timing producing unit 313. The count at the counter 326 is adapted to be inputted to the stop timing producing unit 313 from the counter 326.

Further, the stop timing register 327 is omitted from the register file 324 of the data path 320 to thereby constitute the register file 324 with the periodic program register 325 and the counter 326.

In the present embodiment, the stop timing is defined as being a maximum number of cycles of the process executed by the CPU 300, and the stop timing is stored in the stop timing producing unit 313. Thus, comparison between the count at the counter 326 and the maximum number of cycles of the process executed by the CPU 300 may guarantee completion of the process having the maximum number of cycles, before the count reaches "0".

For example, in performing the pipeline process shown in FIG. 7, considering a pipeline stall, for example, the maximum number of cycles of the process executed by the CPU 300 may be "6", which is a sum total of the maximum number of cycles "5" that is necessary for the load/store instruction (having the maximum number of execution cycles in the instructions executed by the microcomputer M1) to execute and complete the DEC to MA stages, and the PCMA cycle, equivalent to "1" cycle. However, in the case shown in FIG. 6 it is likely that an instruction including the MA stage is executed. Accordingly, the maximum number of cycles is required to be set considering the above.

Therefore, maximum waiting cycles are added to the maximum number of cycles. The maximum waiting cycles refer to the number of cycles including the cycles aborted in the MA stage. In the case shown in FIG. 7, the maximum waiting cycles are "2". This means, in other words, that the number of cycles involved in the load/store stage is "2". Thus, by rendering the maximum number of cycles of the process executed by the CPU 300 to be "8", considering the maximum waiting cycles, the process can be completed before the count of the counter 326 reaches "0".

The maximum waiting cycles can be stored in the form of hardware in the stop timing producing unit 313 when fabricating the CPU 300, or may be provided in the form of an external terminal of the CPU 300.

The stop timing is stored in advance in the stop timing producing unit 313. This can eliminate the stop timing register 327 and eliminate the necessity of setting stop timing register indicated in FIG. 5.

As described above, by setting stop timing in consideration of the stages of other instructions stalled at the MA stage, the non-periodic computer program can be reliably completed.

Fifth Embodiment

Hereinafter will be described a fifth embodiment of the present invention. In the present embodiment, only the differences from the above embodiments will be described. In each of the embodiments described above, the instruction fetch operation has been finished at the stop timing. For example, as shown in FIG. 6, in the preparation period, the IF-stage instruction at an address "0x24" is not executed even if the instruction is executable prior to the periodic computer program execution cycles. It is a feature of the present embodiment that as many instructions as possible are executed prior to the execution cycles of the periodic computer program.

Figure 10:
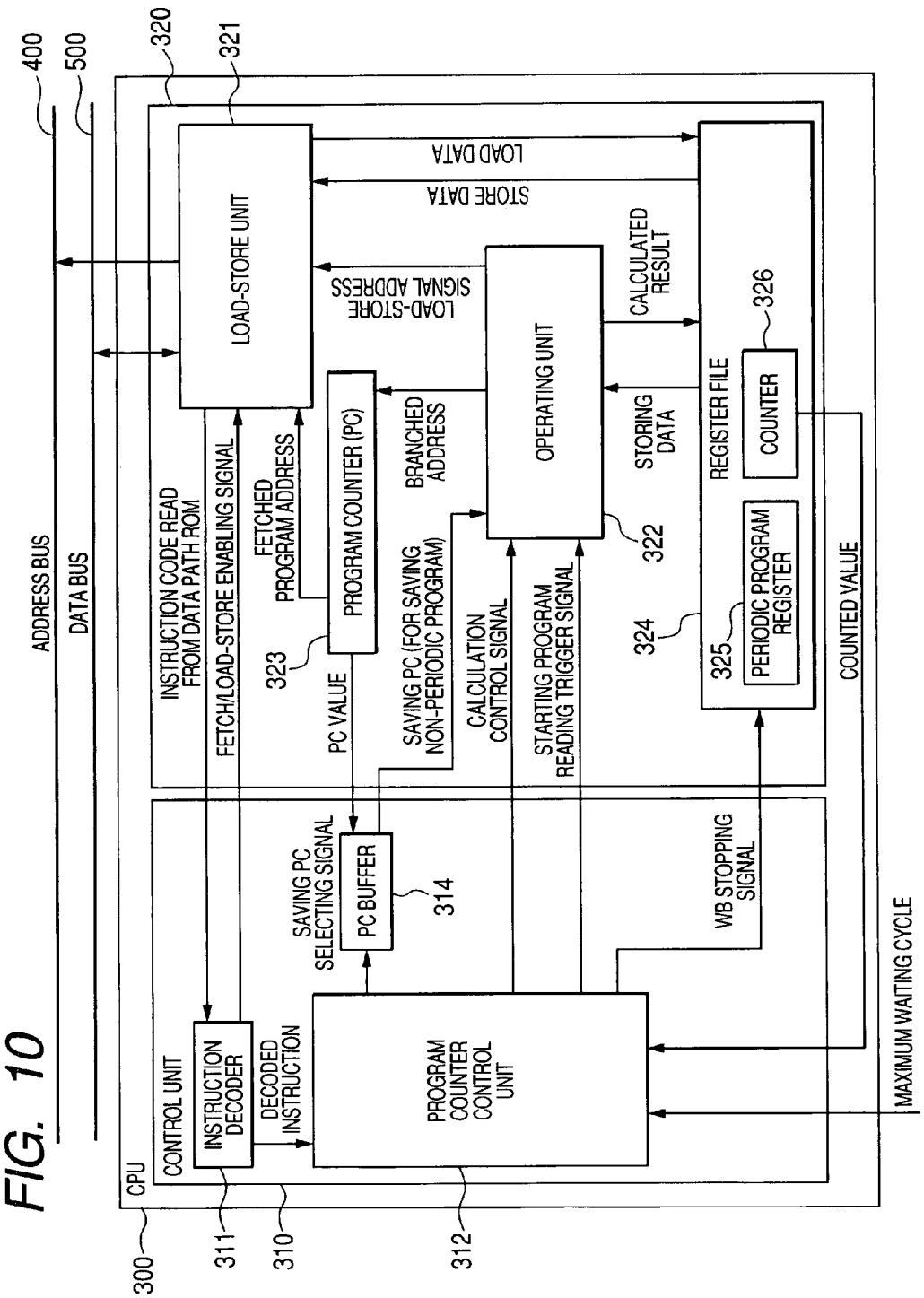
FIG. 10 is a block diagram showing a schematic structure of a central processing unit (CPU) according to a fifth embodiment of the present invention.

FIG. 10 is a block diagram of a CPU according to the present embodiment. As shown in FIG. 10, unlike the CPU 300 of the first embodiment shown in FIG. 1, the control unit 310 of the present embodiment is provided with a program counter buffer 314 (hereinafter referred to as a "PC buffer"). The data path 320 has the same configuration as the one shown in FIG. 9.

Addresses indicated by the PC 323 are inputted, as needed, into the buffer 314 as PC values. Thus, the buffer 314 stores the addresses of the PC 323 as history data.

In the present embodiment, the program counter control unit 312 monitors the counts at the counter 326 and the execution conditions of the pipeline to execute all the instructions that can be completed prior to the PCMA cycle where the count will be "1". The addresses of the PC 323 corresponding to the instructions that cannot be executed, are written into the RAM 200 as the save PC (non-periodic computer program save). The details will be described referring to FIGS. 10 and 11.

Figure 11:
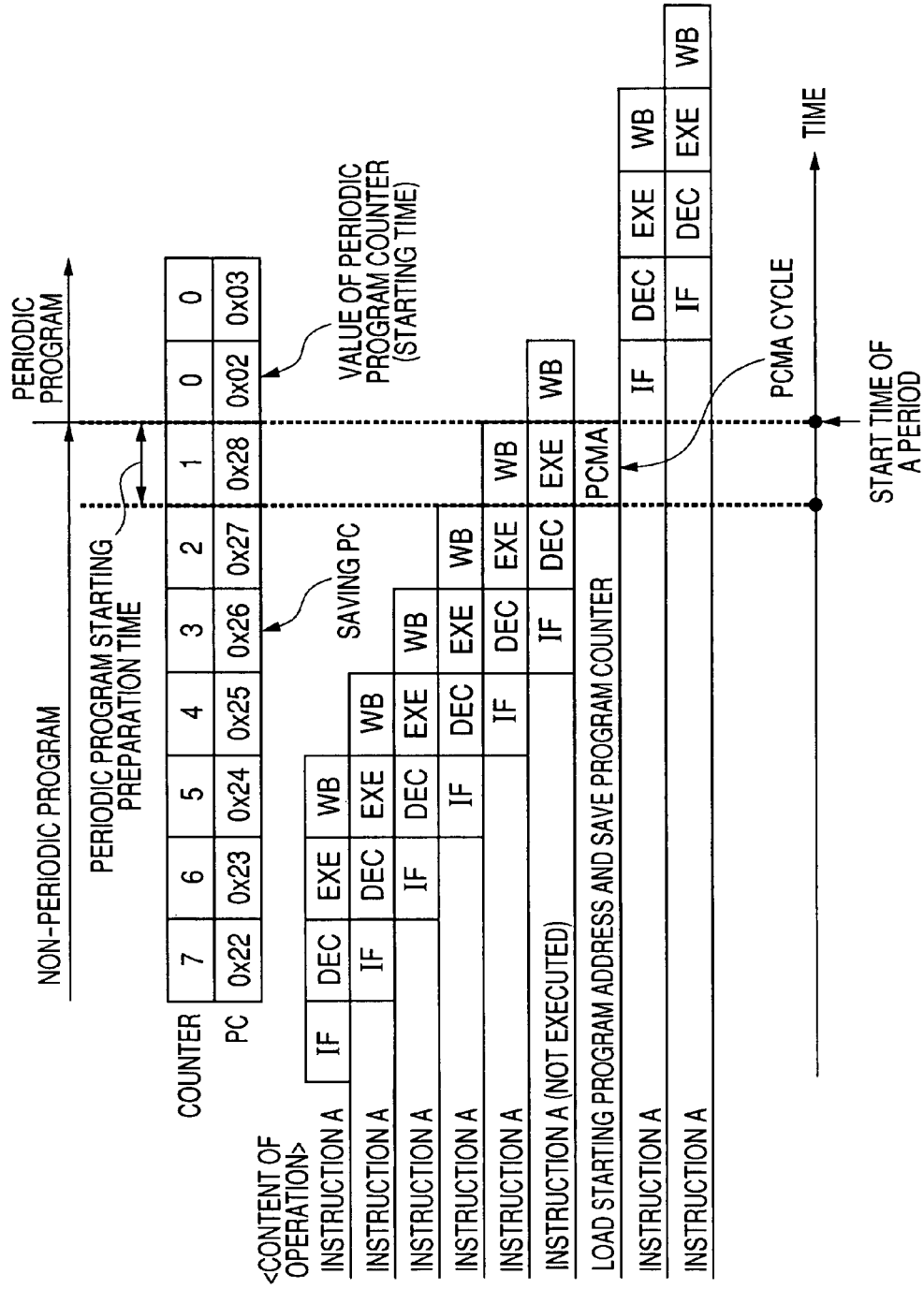
FIG. 11 is a time chart showing a processing sequence according to a fifth embodiment when a program executed by the CPU is changed from a non-periodic computer program to a periodic computer program.

FIG. 11 illustrates a processing sequence according to the present embodiment for switching the non-periodic computer program to the periodic computer program. As shown in the figure, the instruction A that executes the IF stage at the count of "4" at the counter 326, can execute the WB stage at the count of "1" to complete the instruction. However, the instruction that executes the IF stage at the count of "3" at the counter 326, cannot execute the WB stage even at the count of "0" and thus cannot complete the instruction.

Therefore, in the present embodiment, when the PCMA is executed at the count of "1", the program counter control unit 312 determines not to execute the instruction to execute the EXE stage, and acquires information on the address of the instruction as to how many cycles ago the address has been indicated. The case shown in FIG. 11 corresponds to a case where an instruction at the address "0x26" indicated by PC 323 is not executed. In this case, the acquired information is "two cycles ago" from the PCMA cycle. This means that the address to be saved is "0x26".

When the count at the counter 326 becomes "1" and control transfers to the PCMA cycle, a save PC selection signal is inputted to the PC buffer 314 from the program counter control unit 312, so that the value ("0x26") of the PC 323 two cycles ago from the PCMA cycle can be selected. Thus, among the history data of the addresses in the PC 323, which have been stored in the PC buffer 314, the address ("0x26" in case of FIG. 11) corresponding to the save PC selection signal is inputted, as the load/store instruction, to the execution unit 322 for storage in the RAM 200 through the load/store unit 321 and the data bus 500.

Specifically, in the present embodiment, the PCMA cycle equivalent to "1" count falls in the preparation period, and thus time required for control is reduced comparing with the above embodiments. Accordingly, as many instructions as possible can be executed prior to the periodic computer program execution cycles.

As shown in FIG. 10, maximum waiting cycles may be inputted to the program counter control unit 312. In this case, a maximum number of waiting cycles may be estimated. The maximum number of waiting cycles indicates a maximum number of cycles required for the program counter control unit 312 to externally perform reading/writing. Thus, a determination may be made not to execute the instructions of the non-periodic computer program, which will be executed when the estimated value matches the count number indicative of the end of one period.

Sixth Embodiment

Hereinafter will be described a sixth embodiment of the present invention. In the present embodiment, only the differences from the fifth embodiment will be described. Specifically, a description in the present embodiment is focused on a case where some of the instructions making up the non-periodic computer program may include the MA stage.

Figure 12:
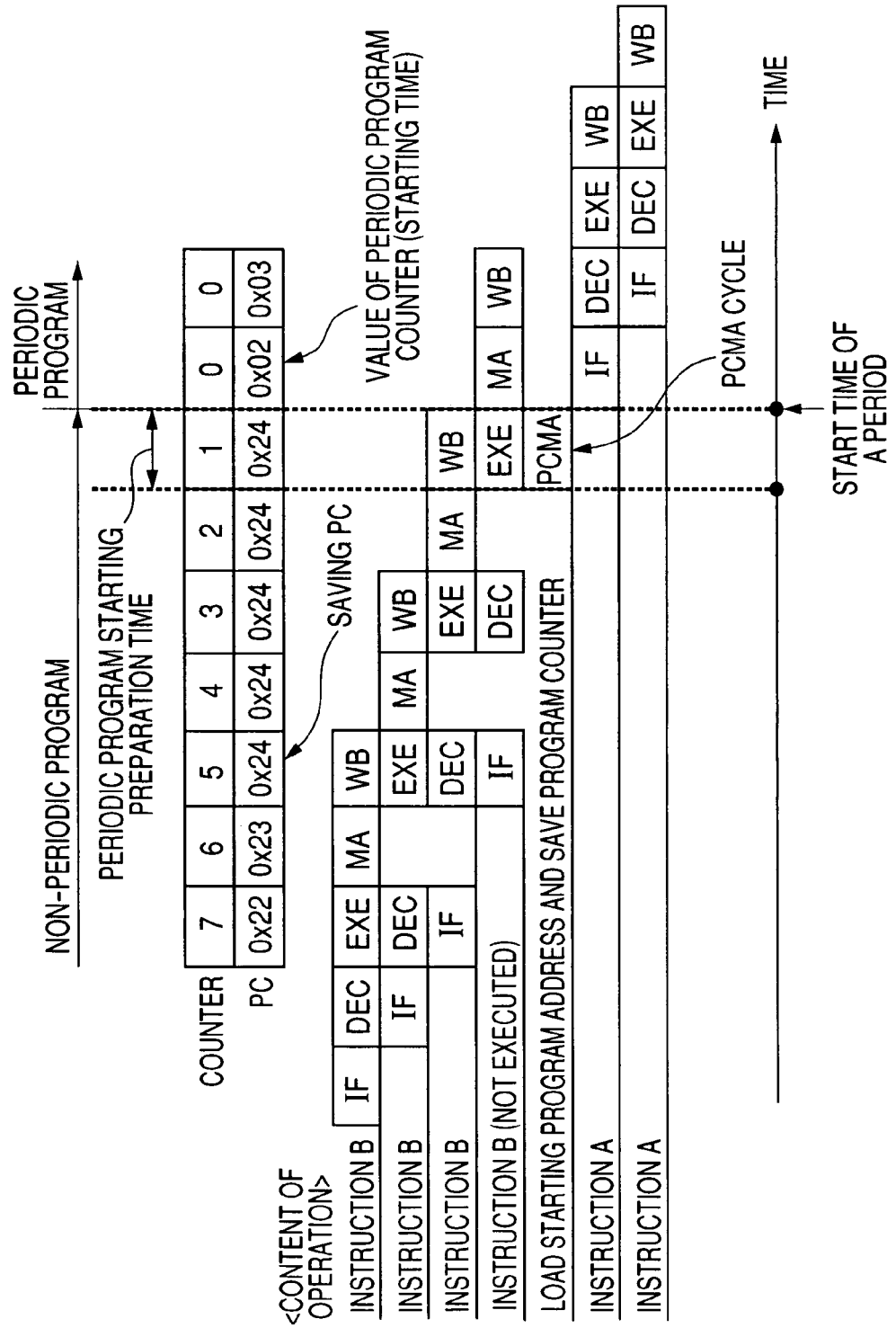
FIG. 12 is a time chart showing a processing sequence according to a sixth embodiment when a program executed by the CPU is changed from a non-periodic computer program to a periodic computer program.

FIG. 12 illustrates a processing sequence according to the present invention for switching the non-periodic computer program to the periodic computer program. For example, the instruction that executes the FI stage at the count of "7" (address "0x22" indicated by the PC 323) at the counter 326, executes the WB stage at the count of "1" to complete the instruction. However, the instruction executed when the address indicated by the PC 323 is "0x24", may not be completed before the count at the counter 326 reaches "1" because of the MA stages included in the instructions that have been executed prior to the subject instruction.

Accordingly, in the present embodiment, the program counter control unit 312 determines that there will be no execution as to the instruction starting from the address "0x24" indicated by the PC 323, which address is four cycles ago from the PCMA cycle. Based on this determination, information of "four cycles ago" from the PCMA cycle, is inputted to the PC buffer 314 as a save PC selection signal.

Thus, the address of the instruction that cannot be completed before the count at the counter 326 reaches "1", is selected from the PC buffer 314 for saving in the RAM 200. Then, after finishing the periodic computer program in the subsequent period, the non-periodic computer program is executed again starting from the instruction indicated by the saved address.

As described above, even when the MA stage is included in an instruction, instructions that cannot be completed before the count at the counter 326 reaches "1" can be saved.

Seventh Embodiment

Hereinafter will be described a seventh embodiment of the present invention. In the present embodiment, only the differences from the fifth and the sixth embodiments will be described. Specifically, a description is focused on a case where a branch instruction of the non-periodic computer program is executed during the preparation period.

Figure 13:
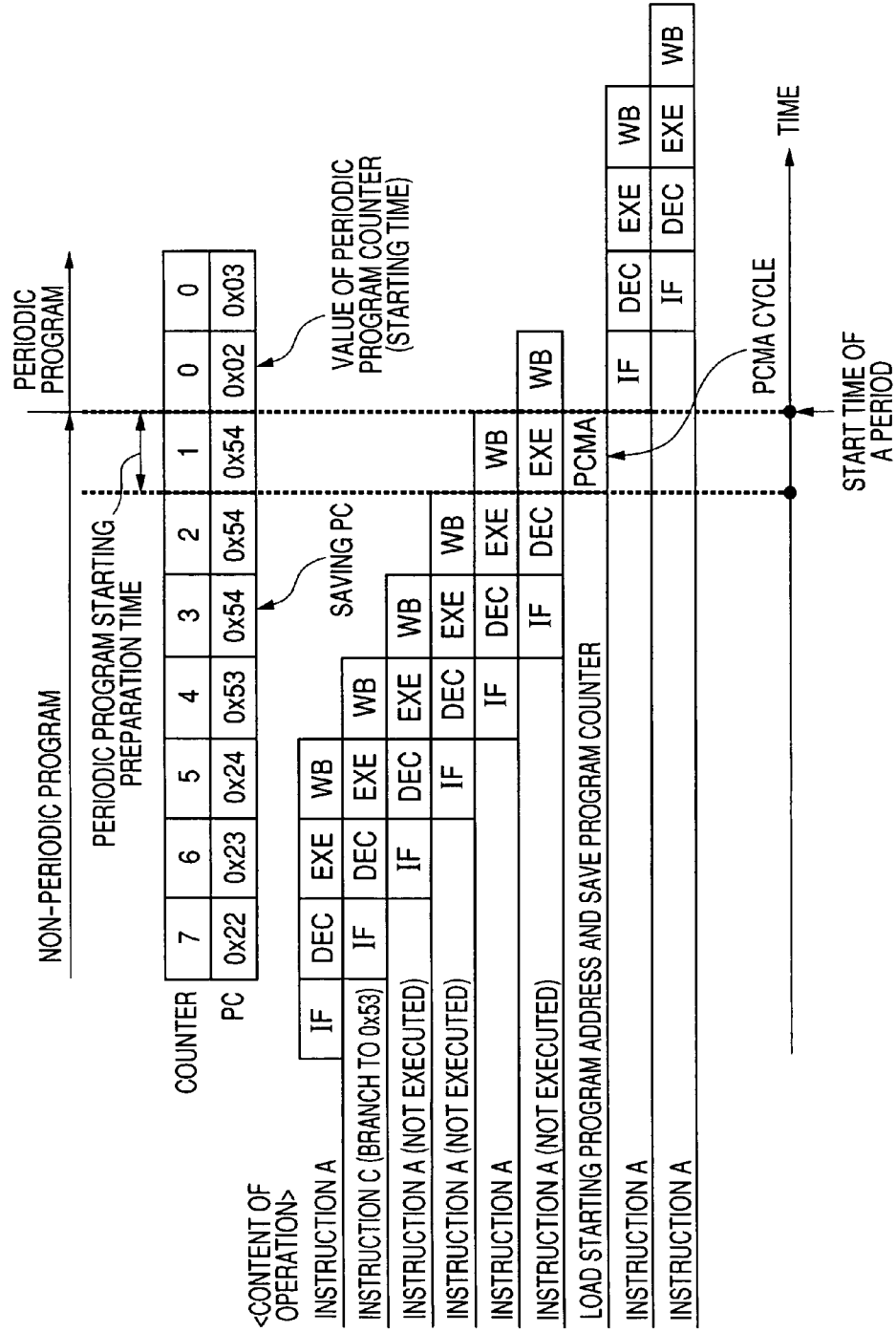
FIG. 13 is a time chart showing a processing sequence according to a seventh embodiment when a program executed by the CPU is changed from a non-periodic computer program to a periodic computer program.

FIG. 13 illustrates a processing sequence according to the present embodiment for switching the non-periodic computer program to the periodic computer program. As shown in the figure, after the branch instruction C (branched to "0x53") has been executed, the IF stage of the instruction at the address "0x53" indicated by the PC 323 is executed. Although the instruction at the address "0x53" can be completed before the count reaches "1", there is a problem that the WB stage of the instruction at an address "0x54" indicated by the PC 323 cannot be completed before the count reaches "1".

In this case as well, control can be effected in the similar fashion to the fifth and the sixth embodiment. Specifically, the program counter control unit 312 determines that an instruction started how many cycles ago from the PCMA cycle, cannot be executed. Then, the address ("0x54" in FIG. 13) corresponding to the cycle number is selected from the PC buffer 314 for storage at the RAM 200.

As described above, even when the branch instruction cannot be finished during the preparation period, the addresses of the instruction may be saved, so that the instruction can be executed starting from the branch address when the non-periodic computer program is subsequently executed.

Eighth Embodiment

Hereinafter will be described an eighth embodiment of the present invention. In the present embodiment, only the differences from the above embodiments will be described. In the above embodiments, the PCMA cycle has been effected when the count at the counter 326 has reached "1", and a save PC has been saved in the RAM 200 by using one cycle. The present embodiment has a feature in that the PCMA cycle, per se, is eliminated.

Figure 14:
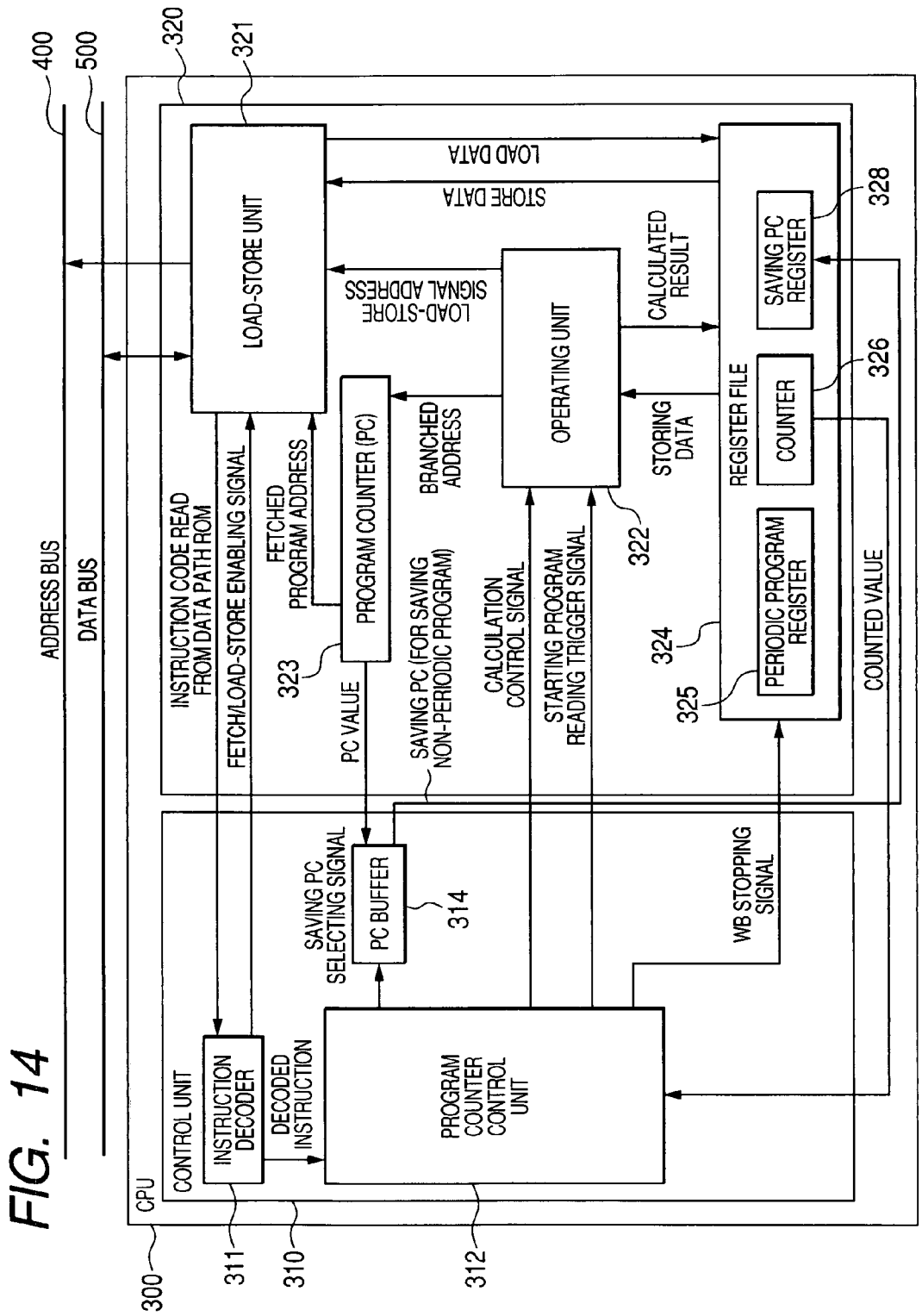
FIG. 14 is a block diagram showing a schematic structure of a central processing unit (CPU) according to an eighth embodiment of the present invention.

FIG. 14 is a block diagram of a CPU according to the present embodiment. The control unit 310 has the same configuration as that shown in FIG. 10. In the data path 320, the register file 324 is provided with a save program counter register 328 (corresponding to the storage register of the present invention, which hereinafter will be referred to as a "save PC register"). The save PC register 328 is a register for storing the save PC (non-periodic computer program save) inputted from the PC buffer 314. It should be appreciated that the configuration of the data path 320 is the same as the one shown in FIG. 9 except for the register file 324.

FIG. 15 illustrates a processing sequence according to the present embodiment for switching the non-periodic computer program to the periodic computer program. As shown in the figure, an instruction at the address "0x27" indicated by the PC 323 cannot execute the EXE stage before the count reaches "1". Therefore, this instruction is saved.

In this case, as shown in FIG. 15, the instant when the count at the counter 326 turns from "1," to "0", an initial address of the periodic computer program is loaded on the PC 323 from the periodic program register 325. At the same time, the save PC is stored in the PC register 328 from the PC buffer 314.

In this way, for the non-periodic computer program, the address indicated by the PC 323 for subsequent execution is saved in the save PC register 328. Thus, when a sub-routine is branched to the non-periodic process which is executed at the completion of the periodic computer program, a non-periodic computer program starting instruction is provided as a branch instruction, whereby the address stored in the save PC register 328 can be loaded on the PC 323. Thus, one instruction may enable restart of the non-periodic computer program without accessing the RAM 200.

As described above, in the present embodiment, unlike the embodiments described above, a period corresponding to the preparation period is absent, and only the count at the counter 326 may enable smooth switching between the non-periodic and periodic computer programs. In this case as well, the non-periodic computer program can be reliably interrupted to periodically execute the periodic computer program.

MODIFICATIONS

In the embodiments described above, the addresses in the PC 323 to be saved have been stored in the RAM 200. Alternatively, such addresses may be stored in other recording media, such as a hard disc and a nonvolatile memory.

The number of cycles (50) corresponding to one period, which has been indicated in the above embodiments, is an example. Alternative to this, other cycle numbers (e.g., "100") may be used. Also, in having the counter 326 counted the number of cycles, either a count-up or count-down method may be employed.

Each of the configurations of the microprocessors according to the first and the second embodiments, has been provided with the PC buffer 314 for storing history data of fetch program addresses by inputting the fetch program addresses indicated by the PC 323 into the control unit 310. Alternatively, the program counter unit 312 may externally save a fetch program address selected from the PC buffer 314. After finishing the periodic computer program, the program counter unit 312 may store the externally saved fetch program address in the PC 323, so that the interrupted non-periodic computer program can be restarted.

What is claimed is:

1. A microprocessor for fetching and executing one of a plurality of instructions of a first computer program from an address of a memory, the address of the memory from which an instruction is to be fetched being indicated by a count value of a program counter, the count value of the program counter being updated to indicate another address of the memory from which another instruction is to be fetched each time execution of the fetched instruction is completed, comprising:
    update ceasing means for ceasing, during the first computer program being executed, updating of the count value of the program counter when the count value of the program counter reaches a first predetermined value so as to interrupt execution of the first computer program; and
    overwriting means for overwriting the count value of the program counter with an initial address of a second computer program when a predetermined time comes so as to start execution of a plurality of instructions of the second computer program from the initial address.

2. The microprocessor according to claim 1, wherein the second program is repeatedly carried out at predetermined intervals.

3. The microprocessor according to claim 1, further comprising:
   memorizing means for memorizing data;
   program address moving means for moving a last value of the address of the memory to the memorizing means after updating of the address is ceased; and
   resuming means for overwriting the count value of the program counter with the last value of the memory to thereby resume the first program from a line thereof after execution of the second program is completed, the line being a location where execution of the first program is ceased at the last address.

4. The microprocessor according to claim 3, wherein the second program is repeatedly carried out at predetermined intervals.

5. The microprocessor according to claim 1, further comprising:
   history recording means for recording a history of last several program addresses of the memory which indicate last several successive instructions of the first program before the first program is interrupted; and
   resuming means for overwriting the count value of the program counter with one of the program addresses recorded by the history recording means to thereby resume the first program from a line thereof corresponding to the one of the program addresses after execution of the second program is completed.

6. The microprocessor according to claim 5, wherein the second program is repeatedly carried out at predetermined intervals.

7. A microcomputer for fetching and executing one of a plurality of instructions of a first computer program from an address of a memory, the address of the memory from which an instruction is to be fetched being indicated by a count value of a program counter, the count value of the program counter being updated to indicate another address of the memory from which another instruction is to be fetched each time execution of the fetched instruction is completed, comprising:
   update ceasing means for ceasing updating of the count value of the program counter when the count value of the program counter reaches a first predetermined value so as to interrupt execution of the first computer program;
   overwriting means for overwriting the count value of the program counter with an initial address of a second computer program when a predetermined time comes so as to start execution of a plurality of instructions of the second computer program from the initial address;
   memorizing means for memorizing data;
   maximum instruction operating time generating means for generating a maximum instruction operating time which needs to be elapsed from when updating of the count value of the program counter is ceased to a completion time when execution of a last instruction fetched from a last value of the address immediately before the updating of the count value of the program counter is ceased; and
   maximum wait time generating means for generating a maximum wait time which needs to elapse for memorizing data related to the last instruction in the memorizing means,
   wherein an interval between a timing when the count value of the program counter reaches a first predetermined value and the predetermined time is equal to a sum of the maximum instruction operating time and the maximum wait time.

8. The microprocessor according to claim 7, wherein
   the microprocessor has a pipeline architecture in which a number of the plurality of instructions of each of the first and second programs are executed in parallel and, even if a hazard is occurred, the hazard is eliminated by a pipeline stall,
   the maximum instruction operating time generated by the maximum instruction operating time generating means is equal to a time which is needed to perform the pipeline stall so as to eliminate the hazard.

9. The microprocessor according to claim 7, wherein the second program is repeatedly carried out at predetermined intervals.

10. A microprocessor having a clock for counting a current time and executing an instruction read out from a program address unit storing a program address, comprising:
    a stopping time register that stores a stopping time at which a first task defined by a first computer program is stopped from being executed;
    a time register that stores a predetermined time at which a second task defined by a second computer program is started to be executed;
    a program register that stores an initial address of the second computer program at which the second task is started to be executed;
    a program counter that stores a program address from which an instruction is read out and updating the program address every time when the instruction is read out; and
    a program counter controlling unit that ceases the program address from updating so as to stop to execute the first task if a condition is satisfied, the condition telling the current time becomes to be equal to the stopping time inputted from the stopping time register while the first task is under execution, and then overwrites the program counter with the initial address of the second computer program stored in the program register so as to start the second task at the predetermined time if the current time becomes to be equal to the predetermined time stored in the time register.

11. The microprocessor according to claim 10, wherein
    the first computer program that defines a first operation is a non-periodic computer program whose run time is not predetermined,
    the second computer program that defines a second operation is a periodic computer program which is repeatedly started to run at predetermined intervals, and
    the predetermined time is one of times which come periodically at the predetermined intervals so that the second operation defined by the second computer program is repeatedly started to carry out at the predetermined intervals in a manner in which the first operation defined by the first computer program is paused before every run starting timing to carry out the second operation.

12. A microprocessor having a memory and a clock for counting a current time and executing an instruction read out from a program address unit storing a program address, comprising:
    a stopping time register that stores a stopping time at which a first task defined by a first computer program is stopped to from being executed;
    a time register that stores a predetermined time at which a second task defined by a second computer program is started to be executed;
    a program register that stores an initial address of the second computer program at which the second task is started to be executed;

a program counter that stores a program address from which an instruction is read out and updating the program address every time when the instruction is read out;

a maximum instruction operating time generating unit that generates a maximum instruction operating time which needs to elapse from the stopping time to a completion time when a last instruction induced by the latest value of the program address before the first time is completed; and a maximum wait time generating unit that generates a maximum wait time which needs to elapse for memorizing data related to the last instruction in the memory; and a program counter controlling unit that ceases the program address from updating so as to stop to execute the first task if a condition is satisfied, the condition telling the current time becomes to be equal to the stopping time inputted from the stopping time register while the first task is under execution, and then overwrites the program counter with the initial address of the second computer program stored in the program register so as to start the second task at the predetermined time if the current time becomes to be equal to the predetermined time stored in the time register, wherein an interval between the stopping time and the predetermined time is equal to the sum of the maximum instruction operating time and the maximum wait time.

13. The microprocessor according to claim 12, wherein the first computer program that defines a first operation is a non-periodic computer program whose starting timing of starting to be run is not predetermined, the second computer program that defines a second operation is a periodic computer program which is repeatedly started to run at a predetermined interval, and the predetermined time is one of times which come periodically at the predetermined intervals so that the second operation defined by the second computer program is repeatedly started to carry out at the predetermined intervals in a manner in which the first operation defined by the first computer program is paused before every timing of starting to carry out the second operation.

14. The microprocessor according to claim 13, further comprising:

a program counter buffer that records a history of last several program addresses which indicate last several successive instructions of the first task before the first task is interrupted; and a resuming unit that resumes the first task by overwriting the program address with one of the program addresses which are included the history of last several program addresses recorded by the program counter buffer so as to resume the first task after the second task is completed.

15. The microprocessor according to claim 12, wherein the microprocessor has a pipeline architecture in which a number of instructions of each of the first and second tasks are executed in parallel and, even if a hazard is occurred, the hazard is eliminated by a pipeline stall, the maximum instruction operating time generated by maximum instruction operating time generating unit is equal to a time which is needed to perform the pipeline stall so as to eliminate the hazard.

16. The microprocessor according to claim 15, further comprising:

a memory;

a program address moving unit that moves the last value of the program address of the first computer program to the memory after the program address is ceased from updating; and a resuming unit that resumes the first task by overwriting the program address with the last value of the program address of the first computer program so as to resume the first task at an interrupted line of the first computer program where a previous execution of the first task is stopped to be executed after the second task is completed.

17. The microprocessor according to claim 12, wherein the first computer program that defines a first operation is a non-periodic computer program whose starting timing of starting to be run is not predetermined, the second computer program that defines a second operation is a periodic computer program which is repeatedly started to run at a predetermined interval, and the predetermined time is one of times which come periodically at the predetermined intervals so that the second operation defined by the second computer program is repeatedly started to carry out at the predetermined interval in a manner in which the first operation defined by the first computer program is paused before every timing of starting to carry out the second operation.

18. A microprocessor having a clock for counting a current time and executing an instruction read out from a program address unit storing a program address, comprising:

a stopping time register that stores a stopping time at which a first task defined by a first computer program is stopped from being executed;

a time register that stores a predetermined time at which a second task defined by a second computer program is started to be executed;

a program register that stores an initial address of the second computer program at which the second task is started to be executed;

a program counter that stores a program address from which an instruction is read out and updating the program address every time when the instruction is read out;

a program counter buffer that records a history of last several program addresses which indicate last several successive instructions of the first task before the first task is interrupted;

a resuming unit that resumes the first task by overwriting the program address with one of the program addresses which are included the history of last several program addresses recorded by the program counter buffer so as to resume the first task after the second task is completed; and a program counter controlling unit that ceases the program address from updating so as to stop to execute the first task if a condition is satisfied, the condition telling the current time becomes to be equal to the stopping time inputted from the stopping time register while the first task is under execution, and then overwrites the program counter with the initial address of the second computer program stored in the program register so as to start the second task at the predetermined time if the current time becomes to be equal to the predetermined time stored time register.

19. The microprocessor according to claim 18, wherein
the first computer program that defines a first operation is a non-periodic computer program whose starting timing of starting to be run is not predetermined,
the second computer program that defines a second operation is a periodic computer program which is repeatedly started to run at a predetermined interval, and
the predetermined time is one of times which come periodically at the predetermined intervals so that the second operation defined by the second computer program is repeatedly started to carry out at the predetermined intervals in a manner in which the first operation defined by the first computer program is paused before every timing of starting to carry out the second operation.

20. The microprocessor according to claim 19, further comprising:
a memory; and
a maximum wait time estimating unit that estimates a maximum wait time which needs to elapse for memorizing data related to the last instruction in the memory,
wherein the program counter controlling unit that escapes from continuing to execute the first task if the maximum wait time estimated by the maximum wait time estimating unit is equal to or larger than an interval between the stopping time and the predetermined time.

21. An instruction executing method by a microprocessor for fetching and executing one of a plurality of instructions of a first computer program from an address of a memory, the address of the memory from which an instruction is to be fetched being indicated by a count value of a program counter, the count value of the program counter being updated to indicate another address of the memory from which another instruction is to be fetched each time execution of the fetched instruction is completed, comprising steps of:
ceasing, during the first computer program being executed, updating of the count value of the program counter when the count value of the program counter reaches a first predetermined value so as to interrupt execution of the first computer program; and
overwriting the count value of the program counter with an initial address of a second computer program when a predetermined time comes so as to start execution of a plurality of instructions of the second computer program from the initial address.

22. An instruction executing method by a microprocessor for fetching and executing one of a plurality of instructions of a first computer program from an address of a memory, the address of the memory from which an instruction is to be fetched being indicated by a count value of a program counter, the count value of the program counter being updated to indicate another address of the memory from which another instruction is to be fetched each time execution of the fetched instruction is completed, comprising steps of:
ceasing updating of the count value of the program counter when the count value of the program counter reaches a first predetermined value so as to interrupt execution of the first computer program;
overwriting the count value of the program counter with an initial address of a second computer program when a predetermined time comes so as to start execution of a plurality of instructions of the second computer program from the initial address;
generating a maximum instruction operating time which needs to be elapsed from when updating of the count value of the program counter is ceased to a completion time when a last instruction fetched from a last value of the address immediately before the updating of the count value of the program counter is completed; and
generating a maximum wait time which needs to elapse for memorizing data related to the last instruction in the memorizing means,
wherein an interval between a timing when the count value of the program counter reaches a first predetermined value and the predetermined time is equal to a sum of the maximum instruction operating time and the maximum wait time.

23. A computer program product comprising a computer readable memory medium tangibly embodying a computer program readable by a microprocessor for fetching and executing one of a plurality of instructions of a first computer program from an address of a memory, the address of the memory from which an instruction is to be fetched being indicated by a count value of a program counter, the count value of the program counter is updated to indicate another address of the memory from which another instruction is to be fetched each time execution of the fetched instruction is completed, the computer program causing the microprocessor to:
cease, during the first computer program being executed, updating of the count value of the program counter when the count value of the program counter reaches a first predetermined value so as to interrupt execution of the first computer program; and
overwrite the count value of the program counter with an initial address of a second computer program when a predetermined time comes so as to start execution of a plurality of instructions of the second computer program from the initial address.

24. The computer program product according to claim 23, wherein the computer program causes the microprocessor to:
generate a maximum instruction operating time which needs to be elapsed from when updating of the count value of the program counter is ceased to a completion time when execution of a last instruction fetched from a last value of the address immediately before the updating of the count value of the program counter is ceased is completed; and
generate a maximum wait time which needs to elapse for memorizing therein data related to the last instruction,
wherein an interval between a timing when the count value of the program counter reaches a first predetermined value and the predetermined time is equal to a sum of the maximum instruction operating time and the maximum wait time.

* * * * *